(12) United States Patent
Igarashi et al.

(10) Patent No.: US 6,912,320 B2
(45) Date of Patent: Jun. 28, 2005

(54) DATA DECOMPRESSING METHOD, DATA DECOMPRESSING UNIT, AND COMPUTER-READABLE STORAGE MEDIUM STORING DATA DECOMPRESSING PROGRAM

(75) Inventors: Isao Igarashi, Maebashi (JP); Tsuyahiko Shimada, Maebashi (JP); Yoshiharu Shimada, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 10/105,208

(22) Filed: Mar. 26, 2002

(65) Prior Publication Data

US 2003/0086125 A1 May 8, 2003

(30) Foreign Application Priority Data

Nov. 7, 2001 (JP) ........................................ 2001-341724

(51) Int. Cl.[7] .............................. G06K 9/36; G06K 9/46
(52) U.S. Cl. .................... 382/244; 382/233; 358/426.13
(58) Field of Search ................................. 382/166, 232, 382/233, 244–247; 341/59, 65, 67; 358/426.13; 375/240.25; 708/203

(56) References Cited

U.S. PATENT DOCUMENTS 3,737,852 A  * 6/1973 Robinson .................... 382/218
4,811,407 A  * 3/1989 Blokker et al. .............. 382/222
5,751,233 A    5/1998 Tateno et al.
2001/0031080 A1  10/2001 Igarashi et al.

FOREIGN PATENT DOCUMENTS

JP          8-317227        11/1996
JP       2001-298624        10/2001

* cited by examiner

*Primary Examiner*—Yon J. Couso
*Assistant Examiner*—Yubin Hung
(74) *Attorney, Agent, or Firm*—Arent Fox PLLC

(57) ABSTRACT

Disclosed herein is a method for decompressing compressed data. First, a table is prepared in which the number of bits, consecutively present to the right of the certain bit and having the same color as the certain bit, is listed. Then, a predetermined number of reference data bits is taken from a reference line. Next, the table is searched with both the reference data bits and a position of an attentional bit in the data bits, in order to detect the number of bits of the same color as the attentional bit which are consecutively present to the right of the attentional bit. Thereafter, a pixel, right away from the attentional bit by a distance equal to the addition of 1 and the detected number of bits, is found as a color-changed pixel on the reference line. The compressed data is decoded based on the position of the found color-changed pixel.

12 Claims, 33 Drawing Sheets

FIG. 2

FIRST TABLE

| NO. | BIT PATTERN | 0 | 1 | 2 | 3 | 4 | 5 | 6 | 7 |
|---|---|---|---|---|---|---|---|---|---|
| 0 | 00000000 | 7 | 6 | 5 | 4 | 3 | 2 | 1 | 0 |
| 1 | 00000001 | 6 | 5 | 4 | 3 | 2 | 1 | 0 | 0 |
| 2 | 00000010 | 5 | 4 | 3 | 2 | 1 | 0 | 0 | 0 |
| 3 | 00000011 | 5 | 4 | 3 | 2 | 1 | 0 | 0 | 0 |
| 4 | 00000100 | 4 | 3 | 2 | 1 | 0 | 0 | 1 | 0 |
| 5 | 00000101 | 4 | 3 | 2 | 1 | 0 | 0 | 0 | 0 |
| 6 | 00000110 | 4 | 3 | 2 | 1 | 0 | 0 | 0 | 0 |
| 7 | 00000111 | 4 | 3 | 2 | 1 | 0 | 0 | 0 | 0 |
| 8 | 00001000 | 3 | 2 | 1 | 0 | 0 | 2 | 1 | 0 |
| 9 | 00001001 | 3 | 2 | 1 | 0 | 0 | 1 | 0 | 0 |
| 10 | 00001010 | 3 | 2 | 1 | 0 | 0 | 0 | 0 | 0 |
| 11 | 00001011 | 3 | 2 | 1 | 0 | 0 | 0 | 0 | 0 |
| 12 | 00001100 | 3 | 2 | 1 | 0 | 0 | 0 | 1 | 0 |
| 13 | 00001101 | 3 | 2 | 1 | 0 | 0 | 0 | 0 | 0 |
| 14 | 00001110 | 3 | 2 | 1 | 0 | 0 | 0 | 0 | 0 |
| 15 | 00001111 | 3 | 2 | 1 | 0 | 0 | 0 | 0 | 0 |
| 16 | 00010000 | 2 | 1 | 0 | 0 | 3 | 2 | 1 | 0 |
| 17 | 00010001 | 2 | 1 | 0 | 0 | 2 | 1 | 0 | 0 |
| 18 | 00010010 | 2 | 1 | 0 | 0 | 1 | 0 | 0 | 0 |
| 19 | 00010011 | 2 | 1 | 0 | 0 | 1 | 0 | 0 | 0 |
| 20 | 00010100 | 2 | 1 | 0 | 0 | 0 | 0 | 1 | 0 |
| 21 | 00010101 | 2 | 1 | 0 | 0 | 0 | 0 | 0 | 0 |
| . | . | . | . | . | . | . | . | . | . |
| 131 | 10000011 | 0 | 4 | 3 | 2 | 1 | 0 | 0 | 0 |
| . | . | . | . | . | . | . | . | . | . |
| 223 | 11011111 | 0 | 0 | 0 | 0 | 0 | 0 | 0 | 0 |
| 224 | 11100000 | 0 | 0 | 0 | 4 | 3 | 2 | 1 | 0 |
| 225 | 11100001 | 0 | 0 | 0 | 3 | 2 | 1 | 0 | 0 |
| 226 | 11100010 | 0 | 0 | 0 | 2 | 1 | 0 | 0 | 0 |
| 227 | 11100011 | 0 | 0 | 0 | 2 | 1 | 0 | 0 | 0 |
| 228 | 11100100 | 0 | 0 | 0 | 1 | 0 | 0 | 1 | 0 |
| 229 | 11100101 | 0 | 0 | 0 | 1 | 0 | 0 | 0 | 0 |
| 230 | 11100110 | 0 | 0 | 0 | 1 | 0 | 0 | 0 | 0 |
| 231 | 11100111 | 0 | 0 | 0 | 1 | 0 | 0 | 0 | 0 |
| 232 | 11101000 | 0 | 0 | 0 | 0 | 0 | 2 | 1 | 0 |
| 233 | 11101001 | 0 | 0 | 0 | 0 | 0 | 1 | 0 | 0 |
| 234 | 11101010 | 0 | 0 | 0 | 0 | 0 | 0 | 0 | 0 |
| 235 | 11101011 | 0 | 0 | 0 | 0 | 0 | 0 | 0 | 0 |
| 236 | 11101100 | 0 | 0 | 0 | 0 | 0 | 0 | 1 | 0 |
| 237 | 11101101 | 0 | 0 | 0 | 0 | 0 | 0 | 0 | 0 |
| 238 | 11101110 | 0 | 0 | 0 | 0 | 0 | 0 | 0 | 0 |
| 239 | 11101111 | 0 | 0 | 0 | 0 | 0 | 0 | 0 | 0 |
| 240 | 11110000 | 0 | 0 | 0 | 0 | 3 | 2 | 1 | 0 |
| 241 | 11110001 | 0 | 0 | 0 | 0 | 2 | 1 | 0 | 0 |
| 242 | 11110010 | 0 | 0 | 0 | 0 | 1 | 0 | 0 | 0 |
| 243 | 11110011 | 0 | 0 | 0 | 0 | 1 | 0 | 0 | 0 |
| 244 | 11110100 | 0 | 0 | 0 | 0 | 0 | 0 | 1 | 0 |
| 245 | 11110101 | 0 | 0 | 0 | 0 | 0 | 0 | 0 | 0 |
| 246 | 11110110 | 0 | 0 | 0 | 0 | 0 | 0 | 0 | 0 |
| 247 | 11110111 | 0 | 0 | 0 | 0 | 0 | 0 | 0 | 0 |
| 248 | 11111000 | 0 | 0 | 0 | 0 | 0 | 2 | 1 | 0 |
| 249 | 11111001 | 0 | 0 | 0 | 0 | 0 | 1 | 0 | 0 |
| 250 | 11111010 | 0 | 0 | 0 | 0 | 0 | 0 | 0 | 0 |
| 251 | 11111011 | 0 | 0 | 0 | 0 | 0 | 0 | 0 | 0 |
| 252 | 11111100 | 0 | 0 | 0 | 0 | 0 | 0 | 1 | 0 |
| 253 | 11111101 | 0 | 0 | 0 | 0 | 0 | 0 | 0 | 0 |
| 254 | 11111110 | 0 | 0 | 0 | 0 | 0 | 0 | 0 | 0 |
| 255 | 11111111 | 0 | 0 | 0 | 0 | 0 | 0 | 0 | 0 |

FIG. 3

SECOND TABLE

| NO. | BIT PATTERN | 0 | 1 | 2 | 3 | 4 | 5 | 6 | 7 |
|---|---|---|---|---|---|---|---|---|---|
| 0 | 00000000 | 0 | 0 | 0 | 0 | 0 | 0 | 0 | 0 |
| 1 | 00000001 | 0 | 0 | 0 | 0 | 0 | 0 | 0 | 0 |
| 2 | 00000010 | 0 | 0 | 0 | 0 | 0 | 0 | 0 | 0 |
| 3 | 00000011 | 0 | 0 | 0 | 0 | 0 | 0 | 1 | 0 |
| 4 | 00000100 | 0 | 0 | 0 | 0 | 0 | 0 | 0 | 0 |
| 5 | 00000101 | 0 | 0 | 0 | 0 | 0 | 0 | 0 | 0 |
| 6 | 00000110 | 0 | 0 | 0 | 0 | 0 | 1 | 0 | 0 |
| 7 | 00000111 | 0 | 0 | 0 | 0 | 0 | 2 | 1 | 0 |
| 8 | 00001000 | 0 | 0 | 0 | 0 | 0 | 0 | 0 | 0 |
| 9 | 00001001 | 0 | 0 | 0 | 0 | 0 | 0 | 0 | 0 |
| 10 | 00001010 | 0 | 0 | 0 | 0 | 0 | 0 | 0 | 0 |
| 11 | 00001011 | 0 | 0 | 0 | 0 | 0 | 0 | 1 | 0 |
| 12 | 00001100 | 0 | 0 | 0 | 0 | 1 | 0 | 0 | 0 |
| 13 | 00001101 | 0 | 0 | 0 | 0 | 1 | 0 | 0 | 0 |
| 14 | 00001110 | 0 | 0 | 0 | 0 | 2 | 1 | 0 | 0 |
| 15 | 00001111 | 0 | 0 | 0 | 0 | 3 | 2 | 1 | 0 |
| 16 | 00010000 | 0 | 0 | 0 | 0 | 0 | 0 | 0 | 0 |
| ... | ... | ... | ... | ... | ... | ... | ... | ... | ... |
| 223 | 11011111 | 1 | 0 | 0 | 4 | 3 | 2 | 1 | 0 |
| 224 | 11100000 | 2 | 1 | 0 | 0 | 0 | 0 | 0 | 0 |
| 225 | 11100001 | 2 | 1 | 0 | 0 | 0 | 0 | 0 | 0 |
| 226 | 11100010 | 2 | 1 | 0 | 0 | 0 | 0 | 0 | 0 |
| 227 | 11100011 | 2 | 1 | 0 | 0 | 0 | 0 | 1 | 0 |
| 228 | 11100100 | 2 | 1 | 0 | 0 | 0 | 0 | 0 | 0 |
| 229 | 11100101 | 2 | 1 | 0 | 0 | 0 | 0 | 0 | 0 |
| 230 | 11100110 | 2 | 1 | 0 | 0 | 0 | 1 | 0 | 0 |
| 231 | 11100111 | 2 | 1 | 0 | 0 | 0 | 2 | 1 | 0 |
| 232 | 11101000 | 2 | 1 | 0 | 0 | 0 | 0 | 0 | 0 |
| 233 | 11101001 | 2 | 1 | 0 | 0 | 0 | 0 | 0 | 0 |
| 234 | 11101010 | 2 | 1 | 0 | 0 | 0 | 0 | 0 | 0 |
| 235 | 11101011 | 2 | 1 | 0 | 0 | 0 | 0 | 1 | 0 |
| 236 | 11101100 | 2 | 1 | 0 | 0 | 1 | 0 | 0 | 0 |
| 237 | 11101101 | 2 | 1 | 0 | 0 | 1 | 0 | 0 | 0 |
| 238 | 11101110 | 2 | 1 | 0 | 0 | 2 | 1 | 0 | 0 |
| 239 | 11101111 | 2 | 1 | 0 | 0 | 3 | 2 | 1 | 0 |
| 240 | 11110000 | 3 | 2 | 1 | 0 | 0 | 0 | 0 | 0 |
| 241 | 11110001 | 3 | 2 | 1 | 0 | 0 | 0 | 0 | 0 |
| 242 | 11110010 | 3 | 2 | 1 | 0 | 0 | 0 | 0 | 0 |
| 243 | 11110011 | 3 | 2 | 1 | 0 | 0 | 0 | 1 | 0 |
| 244 | 11110100 | 3 | 2 | 1 | 0 | 0 | 0 | 0 | 0 |
| 245 | 11110101 | 3 | 2 | 1 | 0 | 0 | 0 | 0 | 0 |
| 246 | 11110110 | 3 | 2 | 1 | 0 | 0 | 1 | 0 | 0 |
| 247 | 11110111 | 3 | 2 | 1 | 0 | 0 | 2 | 1 | 0 |
| 248 | 11111000 | 4 | 3 | 2 | 1 | 0 | 0 | 0 | 0 |
| 249 | 11111001 | 4 | 3 | 2 | 1 | 0 | 0 | 0 | 0 |
| 250 | 11111010 | 4 | 3 | 2 | 1 | 0 | 0 | 0 | 0 |
| 251 | 11111011 | 4 | 3 | 2 | 1 | 0 | 0 | 1 | 0 |
| 252 | 11111100 | 5 | 4 | 3 | 2 | 1 | 0 | 0 | 0 |
| 253 | 11111101 | 5 | 4 | 3 | 2 | 1 | 0 | 0 | 0 |
| 254 | 11111110 | 6 | 5 | 4 | 3 | 2 | 1 | 0 | 0 |
| 255 | 11111111 | 7 | 6 | 5 | 4 | 3 | 2 | 1 | 0 |

FIG. 4

| | | THIRD TABLE | FOURTH TABLE |
|---|---|---|---|
| NO. | BIT PATTERN | POSITION OF THE FIRST WHITE FROM LEFT IN 1 BYTE | POSITION OF THE FIRST BLACK FROM LEFT IN 1 BYTE |
| 0 | 00000000 | 1 | 0 |
| 1 | 00000001 | 1 | 8 |
| 2 | 00000010 | 1 | 7 |
| 3 | 00000011 | 1 | 7 |
| 4 | 00000100 | 1 | 6 |
| 5 | 00000101 | 1 | 6 |
| 6 | 00000110 | 1 | 6 |
| 7 | 00000111 | 1 | 6 |
| 8 | 00001000 | 1 | 5 |
| 9 | 00001001 | 1 | 5 |
| 10 | 00001010 | 1 | 5 |
| 11 | 00001011 | 1 | 5 |
| 12 | 00001100 | 1 | 5 |
| 13 | 00001101 | 1 | 5 |
| 14 | 00001110 | 1 | 5 |
| 15 | 00001111 | 1 | 5 |
| 16 | 00010000 | 1 | 4 |
| . | . | . | . |
| . | . | . | . |
| . | . | . | . |
| 224 | 11100000 | 4 | 1 |
| 225 | 11100001 | 4 | 1 |
| 226 | 11100010 | 4 | 1 |
| 227 | 11100011 | 4 | 1 |
| 228 | 11100100 | 4 | 1 |
| 229 | 11100101 | 4 | 1 |
| 230 | 11100110 | 4 | 1 |
| 231 | 11100111 | 4 | 1 |
| 232 | 11101000 | 4 | 1 |
| 233 | 11101001 | 4 | 1 |
| 234 | 11101010 | 4 | 1 |
| 235 | 11101011 | 4 | 1 |
| 236 | 11101100 | 4 | 1 |
| 237 | 11101101 | 4 | 1 |
| 238 | 11101110 | 4 | 1 |
| 239 | 11101111 | 4 | 1 |
| 240 | 11110000 | 5 | 1 |
| 241 | 11110001 | 5 | 1 |
| 242 | 11110010 | 5 | 1 |
| 243 | 11110011 | 5 | 1 |
| 244 | 11110100 | 5 | 1 |
| 245 | 11110101 | 5 | 1 |
| 246 | 11110110 | 5 | 1 |
| 247 | 11110111 | 5 | 1 |
| 248 | 11111000 | 6 | 1 |
| 249 | 11111001 | 6 | 1 |
| 250 | 11111010 | 6 | 1 |
| 251 | 11111011 | 6 | 1 |
| 252 | 11111100 | 7 | 1 |
| 253 | 11111101 | 7 | 1 |
| 254 | 11111110 | 8 | 1 |
| 255 | 11111111 | 0 | 1 |

FIG. 5

FIFTH TABLE

| NO. | BIT PATTERN | 0 | 1 | 2 | 3 | 4 | 5 | 6 | 7 |
|---|---|---|---|---|---|---|---|---|---|
| 0 | 00000000 | 0 | 0 | 0 | 0 | 0 | 0 | 0 | 0 |
| 1 | 00000001 | 0 | 0 | 0 | 0 | 0 | 0 | 0 | 1 |
| 2 | 00000010 | 0 | 0 | 0 | 0 | 0 | 0 | 1 | 0 |
| 3 | 00000011 | 0 | 0 | 0 | 0 | 0 | 0 | 1 | 1 |
| 4 | 00000100 | 0 | 0 | 0 | 0 | 0 | 1 | 0 | 0 |
| 5 | 00000101 | 0 | 0 | 0 | 0 | 0 | 1 | 0 | 1 |
| 6 | 00000110 | 0 | 0 | 0 | 0 | 0 | 1 | 1 | 0 |
| 7 | 00000111 | 0 | 0 | 0 | 0 | 0 | 1 | 1 | 1 |
| 8 | 00001000 | 0 | 0 | 0 | 0 | 1 | 0 | 0 | 0 |
| 9 | 00001001 | 0 | 0 | 0 | 0 | 1 | 0 | 0 | 1 |
| 10 | 00001010 | 0 | 0 | 0 | 0 | 1 | 0 | 1 | 0 |
| 11 | 00001011 | 0 | 0 | 0 | 0 | 1 | 0 | 1 | 1 |
| 12 | 00001100 | 0 | 0 | 0 | 0 | 1 | 1 | 0 | 0 |
| 13 | 00001101 | 0 | 0 | 0 | 0 | 1 | 1 | 0 | 1 |
| 14 | 00001110 | 0 | 0 | 0 | 0 | 1 | 1 | 1 | 0 |
| 15 | 00001111 | 0 | 0 | 0 | 0 | 1 | 1 | 1 | 1 |
| 16 | 00010000 | 0 | 0 | 0 | 1 | 0 | 0 | 0 | 0 |
| 17 | 00010001 | 0 | 0 | 0 | 1 | 0 | 0 | 0 | 1 |
| 18 | 00010010 | 0 | 0 | 0 | 1 | 0 | 0 | 1 | 0 |
| 19 | 00010011 | 0 | 0 | 0 | 1 | 0 | 0 | 1 | 1 |
| 20 | 00010100 | 0 | 0 | 0 | 1 | 0 | 1 | 0 | 0 |
| 21 | 00010101 | 0 | 0 | 0 | 1 | 0 | 1 | 0 | 1 |
| ... | ... | ... | ... | ... | ... | ... | ... | ... | ... |
| 223 | 11011111 | 1 | 1 | 0 | 1 | 1 | 1 | 1 | 1 |
| 224 | 11100000 | 1 | 1 | 1 | 0 | 0 | 0 | 0 | 0 |
| 225 | 11100001 | 1 | 1 | 1 | 0 | 0 | 0 | 0 | 1 |
| 226 | 11100010 | 1 | 1 | 1 | 0 | 0 | 0 | 1 | 0 |
| 227 | 11100011 | 1 | 1 | 1 | 0 | 0 | 0 | 1 | 1 |
| 228 | 11100100 | 1 | 1 | 1 | 0 | 0 | 1 | 0 | 0 |
| 229 | 11100101 | 1 | 1 | 1 | 0 | 0 | 1 | 0 | 1 |
| 230 | 11100110 | 1 | 1 | 1 | 0 | 0 | 1 | 1 | 0 |
| 231 | 11100111 | 1 | 1 | 1 | 0 | 0 | 1 | 1 | 1 |
| 232 | 11101000 | 1 | 1 | 1 | 0 | 1 | 0 | 0 | 0 |
| 233 | 11101001 | 1 | 1 | 1 | 0 | 1 | 0 | 0 | 1 |
| 234 | 11101010 | 1 | 1 | 1 | 0 | 1 | 0 | 1 | 0 |
| 235 | 11101011 | 1 | 1 | 1 | 0 | 1 | 0 | 1 | 1 |
| 236 | 11101100 | 1 | 1 | 1 | 0 | 1 | 1 | 0 | 0 |
| 237 | 11101101 | 1 | 1 | 1 | 0 | 1 | 1 | 0 | 1 |
| 238 | 11101110 | 1 | 1 | 1 | 0 | 1 | 1 | 1 | 0 |
| 239 | 11101111 | 1 | 1 | 1 | 0 | 1 | 1 | 1 | 1 |
| 240 | 11110000 | 1 | 1 | 1 | 1 | 0 | 0 | 0 | 0 |
| 241 | 11110001 | 1 | 1 | 1 | 1 | 0 | 0 | 0 | 1 |
| 242 | 11110010 | 1 | 1 | 1 | 1 | 0 | 0 | 1 | 0 |
| 243 | 11110011 | 1 | 1 | 1 | 1 | 0 | 0 | 1 | 1 |
| 244 | 11110100 | 1 | 1 | 1 | 1 | 0 | 1 | 0 | 0 |
| 245 | 11110101 | 1 | 1 | 1 | 1 | 0 | 1 | 0 | 1 |
| 246 | 11110110 | 1 | 1 | 1 | 1 | 0 | 1 | 1 | 0 |
| 247 | 11110111 | 1 | 1 | 1 | 1 | 0 | 1 | 1 | 1 |
| 248 | 11111000 | 1 | 1 | 1 | 1 | 1 | 0 | 0 | 0 |
| 249 | 11111001 | 1 | 1 | 1 | 1 | 1 | 0 | 0 | 1 |
| 250 | 11111010 | 1 | 1 | 1 | 1 | 1 | 0 | 1 | 0 |
| 251 | 11111011 | 1 | 1 | 1 | 1 | 1 | 0 | 1 | 1 |
| 252 | 11111100 | 1 | 1 | 1 | 1 | 1 | 1 | 0 | 0 |
| 253 | 11111101 | 1 | 1 | 1 | 1 | 1 | 1 | 0 | 1 |
| 254 | 11111110 | 1 | 1 | 1 | 1 | 1 | 1 | 1 | 0 |
| 255 | 11111111 | 1 | 1 | 1 | 1 | 1 | 1 | 1 | 1 |

DATA DECOMPRESSING METHOD, DATA DECOMPRESSING UNIT, AND COMPUTER-READABLE STORAGE MEDIUM STORING DATA DECOMPRESSING PROGRAM

BACKGROUND OF THE INVENTION

1) Field of the Invention

The present invention relates to a technique for decoding and decompressing compressed data obtained, for example, by modified-modified READ (MMR) coding (where READ is an acronym for relative element address designate).

2) Description of the Related Art

Still images, such as text images, etc., which are dealt with by a facsimile apparatus are basically images expressed with two levels, a white level and a black level. The still images are constructed of binary image data. In the binary text images to be dealt with by a facsimile apparatus, consecutive white pixels or black pixels often appear.

Hence, for a large quantity of binary image data, a data compression process is performed by coding consecutive white or black pixels at a place where they change to a black or white pixel, using MMR coding.

FIG. 27 schematically shows a general data compressing unit for carrying out such a data compression process by MMR coding.

As shown in the figure, the input side of the data compressing unit 1 is connected with an uncompressed data storage section 2, while the output side is connected to a compressed data storage section 3.

The data compressing unit 1 is constructed of an input buffer 4, a compressing section 5, an output buffer 6, and a reference table holding section 7.

The uncompressed data storage section 2 stores, for example, binary image data (uncompressed data; data to be compressed) read for document transmission. The compressed data storage section 3 stores image data (compressed data) coded by the data compressing unit 1.

In the compression process within the data compressing unit 1, binary image data sampled at 8 bits per 1 mm, for example, are input to the input buffer 4 and sent to the compressing section 5. The compressing section 5 refers to the modified Huffman (MH) code table or modified READ (MR) code table held in the reference table holding section 7, and codes the input image data. The coded data (compressed data) are sent to the output buffer 6 and stored in the compressed data storage section 3.

Now, the process of coding and compressing binary image data will be described with reference to FIGS. 28 to 31 and Table 1 (two-dimensional code table). Table 1 is stored as an MR code table in the reference table holding section 7.

TABLE 1

| Mode | Pixel to be coded | | Symbol | Code |
|---|---|---|---|---|
| Pass | b1, b2 | | P | 0001 |
| Horizontal | A0, a1, a2 | | H | 001 + M(a0a1) + M(a1a2) |
| Vertical | a1 just under b1 | a1b1 = 0 | V(0) | 1 |
| | a1 to the right of b1 | a1b1 = 1 | Vr(1) | 011 |
| | | a1b1 = 2 | Vr(2) | 000011 |
| | | a1b1 = 3 | Vr(3) | 0000011 |
| | a1 to the left of b1 | a1b1 = 1 | Vl(1) | 010 |
| | | a1b1 = 2 | Vl(2) | 000010 |
| | | a1b1 = 3 | Vl(3) | 0000010 |

FIGS. 28 to 31 schematically show the bit sequence of the binary image data input from the uncompressed data storage section 2 to the input buffer 4, a single square denoting a single 1-bit pixel. A white square denotes a white pixel and a shaded square denotes a black pixel. The top line is the reference line, while the bottom line is the coding line. The reference line is the immediately prior image data bits, coded and transmitted from the output buffer 6 to the compressed data storage section 4. The coding line is the current image data bits input from the uncompressed data storage section 2 to the input buffer 4.

In MMR coding, a change in the color of a pixel on the coding line is judged from left to right in FIGS. 28 to 31. When a change from a white pixel to a black pixel is made, the position of the black pixel (color-changed pixel) is coded and the distance between the position of the black pixel and the position of a color-changed pixel on the reference line is coded. Similarly, when a change from a black pixel to a while pixel is made, the position of the white pixel (color-changed pixel) is coded and the distance between the position of the white pixel and the position of a color-changed pixel on the reference line is coded. Therefore, there is a need to detect the positions of color-changed pixels a0, a1, and a2 on the coding line and the positions of color-changed pixels b1 and b2 on the reference line. The color-changed pixel refers to a pixel that differs in color from its left neighbor on the same scanning line.

In the coding line, a0 is a pixel designated as a start color-changed pixel, a1 is the first color-changed pixel which is to the right of the start color-changed pixel a0, and a2 is the first color-changed pixel which is to the right of the color-changed pixel a1. At the head of the coding line, a virtual white pixel that is positioned to the left of the first pixel is assumed to be a0. In the reference line, b0 is a pixel (start color-changed pixel) which is located right above the start color-changed pixel a0, b1 is the first color-changed pixel that is to the right of the start color-changed pixel a0, and is of color opposite to a0, and b2 is the first color-changed pixel that is to the right of the color-changed pixel b1.

Next, a description will be given of the coding of the coding line based on the reference line. In the coding, a pass mode, a vertical mode, or a horizontal mode is employed depending on the positional relationship between the start color-changed pixel a0 and the reference color-changed pixel a1, a2, b1, or b2.

The pass mode is a mode that is selected when the pixel b2 is to the left of the pixel a1. In this pass mode, the pixel a0 is repositioned to the pixel just under the pixel b2. In this case, symbolic code P (code 0001), which is listed in Table 1, is transmitted.

In FIG. 28, the immediately prior coding is performed in the pass mode, and the pixel a0 is repositioned to the pixel just under the pixel b2 positioned during the previous coding. An example of pass-mode coding is shown in FIG. 29. Since the pixel b2 during the current coding is to the left of the pixel a1, the current coding (of the pixels b1 and b2) is performed in the pass mode. That is, code P (code 0001) is transmitted to the output buffer 6. Following the processing of this code, the pixel just under the pixel b2 is set as the start pixel a0 for the next coding.

The vertical mode is a mode that is selected when the pixel b2 is at the same position as the pixel a1 or to the right of the pixel a1 and the relative distance |a1b1| between the pixels a1 and b1 is less than or equal to 3 pixels. When it arises, coding with respect to the pixel a1 is performed with the relative distance |a1b1| corresponding to one of seven values (codes 1, 011, 000011, 0000011, 010, 000010, and 0000010) denoted by symbolic codes V(0), Vr(1), Vr(2), Vr(3), Vl(1), Vl(2), and Vl(3), as listed in Table 1. After the coding, the start pixel a0 for the next coding is repositioned to the pixel a1 positioned during the current coding. The letter "r" in the symbolic code indicates that the pixel a1 is to the right of the pixel b1 . The "l " in the symbolic code indicates that the pixel a1 is to the left of the pixel b1 . The numeral within the parenthesis indicates the relative distance (number of pixels).

In the example shown in FIG. 28, the pixel b2 is to the right of the pixel a1, also the pixel a1 is to the left of the pixel b1, and the relative distance |a1b1| is 1 pixel. Therefore, MMR coding is performed in the vertical mode, and the code 010 corresponding to the symbolic code Vl(1) is transmitted to the output buffer 6. Thereafter, the pixel a1 during the current coding is set as the start pixel a0 for the next coding, and the pixels a2 and b2 are set as the pixels a1 and b1 for the next coding, respectively. If the pixels a0, a1, and b1 are repositioned in this manner, the pixel b2 is to the right of the pixel a1 and the relative distance |a1b1| is 0, as shown in FIG. 31. Thus, the next coding is similarly performed in the vertical mode. The code 1 corresponding to the symbolic code V(0) is transmitted to the output buffer 6.

Another example of vertical mode coding is shown in FIG. 30. In the example shown in the figure, the pixel b2 is to the right of the pixel a1, also the pixel a1 is to the right of the pixel b1, and the relative distance |a1b1| is 2 pixels. Thus, MMR coding is performed in the vertical mode, and the code 000011 corresponding to the symbolic code Vr(2) is transmitted to the output buffer 6.

On the other hand, the horizontal mode, as shown in FIG. 31, is a mode that is selected when the pixel b2 is at the same position as the pixel a1 or to the right of the pixel a1 and the relative distance |a1b1| between the pixels a1 and b1 is greater than or equal to 3 pixels. In FIG. 31, the relative distance |a1b1| is 4 pixels. As listed in Table 1, the distance a0a1 between the pixel a0 and the pixel a1 and the distance a1a2 between the pixel a1 and a2 are obtained, then the values M(a0a1) and M(a1a2) corresponding to these distances a0a1 and a1a2 are read out from the MH code table held in the reference table holding section 7, and coding with respect to the pixels a0, a1, and a2 is performed by symbolic code H (code 001+M(a0a1)+M(a1a2)). After the coding, the start pixel a0 for the next coding is repositioned to the pixel a2 positioned during the current coding.

An example of horizontal mode coding is shown in FIG. 31. In the example shown in the figure, the pixel b2 is to the right of the pixel a1, and the relative distance |a1b1| is 4 pixels. Thus, coding is performed in the horizontal mode. That is, because a0a1=8 and a1a2=4, the code=001+M(8)+M(4) corresponding to the symbolic code H is transmitted to the output buffer 6. The pixel a2 is repositioned to the start pixel a0 for the next coding.

In this manner, the image data shown in FIG. 28 is coded like ". . . 00010101 . . . ." That is, image data is coded based on the position of a color-changed pixel on the coding line, the position of a color-changed pixel on the reference line, and the distance between the two pixels.

The above-mentioned coding procedure (operation of the compressing section 5) will be described according to a flowchart (steps S11 to S28) shown in FIG. 32. First, suppose the pixels on the reference line are all white (step S11). Then, the first coding line is set (step S12) and the start pixel a0 is positioned as a virtual white pixel to the left of the first pixel (step S13).

Thereafter, pixels a1, b1, and b2 are detected (steps S14 to S16) and it is judged whether or not the pixel b2 is to the left of the pixel a1 (step S17). If it is to the left (route "YES" in step S17), the above-mentioned pass-mode coding is performed (step S18) and the pixel just under the pixel b2 is set as the start pixel a0 for the next coding (step S19).

When the pixel b2 is at the same position as the pixel a1 or to the right of the pixel a1 (route "NO" in step S17), it is judged whether or not the relative distance |a1b1| is less than or equal to 3 pixels (step S20).

When the relative distance |a1b1| is 3 pixels or less (route "YES" in step S20), the above-mentioned vertical mode coding is performed (step S21) and the pixel a1 during the current coding is set as the start pixel a0 for the next coding (step S22).

On the other hand, when the relative distance |a1b1| is 4 pixels or greater (route "NO" in step S20), a pixel a2 is detected (step S23) and the above-mentioned horizontal mode coding is performed (step S24). The pixel a2 during the current coding is set as the start pixel a0 for the next coding (step S25).

Next, it is judged whether or not the coding process has been executed up to the last pixel on the coding line. That is, it is judged whether or not the coding position has reached end-of-line (EOL) (step S26). If it has not reached (route "NO" in step S26), the process returns to step S14 and repeatedly carries out the above-mentioned steps S14 to S26.

If it has reached EOL (route "YES" in step S26), it is judged whether or not the coding process has been executed up to the end of image data to be coded. That is, it is judged whether or not the coding position has reached end-of-data (EOD) (step S27). If it has not reached EOD (route "NO" in step S27), the process returns to step S12 and repeatedly carries out the above-mentioned steps S12 to S27. When it arises, in step 12 the next coding line is extracted and the previous coding line is set as the reference line. If it has reached EOD (route "YES" in step S27), the coding process ends.

When decompressing the image data compressed as described above, the coded data corresponding to each line (coding line) is serially read out from the head thereof, and the decoding process is carried out according to a recognized mode.

FIG. 33 schematically shows a general data decompressing unit for carrying out such a decoding process.

As shown in the figure, the input side of the data decompressing unit 11 is connected with a compressed data storage section 12, while the output side is connected to a decompressed data storage section 13.

The data decompressing unit 11 is constructed of an input buffer 14, a decompressing section 15, an output buffer 16, and a reference table holding section 17.

The compressed data storage section 12 stores image data coded (or compressed), for example, by the above-mentioned data compressing unit 1. The decompressed data storage section 13 serially stores image data decoded (or decompressed) by the data decompressing unit 11.

In the decompression process within the data decompressing unit 11, compressed data are input to the input buffer 14 and sent to the decompressing section 15. The decompressing section 15 recognizes a mode by the code of the input data, refers to the modified Huffman (MH) code table or modified READ (MR) code table (see the two-dimensional code table in Table 1) held in the reference table holding section 17, and decodes the input data according to the recognized mode. The decoded data (decompressed data)

are sent to the output buffer 16 and stored in the decompressed data storage section 13.

The decoding procedure in the decompressing section 15 will be described according to a flowchart (steps S31 to S47) shown in FIG. 34. First, suppose the pixels on a reference line are all white (step S31) Then, the first decoding line is set (step S32) and the start pixels a0 and b0 are positioned as virtual white pixels to the left of the first pixel of the reference line and the left of the first pixel of the decoding line (step S33).

The coded data corresponding to the decoding line is serially read out from the head thereof, and the coding mode is recognized according to both the code in the coded data and the two-dimensional code table (see Table 1) held in the reference table holding section 17 (step S34).

When, in step S34, the mode is recognized to be a pass mode (code 0001; route "PASS"), a pixel b2 on the reference line relative to a start pixel b0 is first detected (step S35). If the pixel b2 is detected, pixels of the color of a0 are laid down on the decoding line up to the position of the pixel b2, whereby a decoding process corresponding to the pass mode is carried out (step S36) Next, on the decoding line, the pixel just under the pixel b2 is set as the next start pixel a0 (step S37). The color of the next start pixel a0 is set to the color of the pixel b2 (step S38).

When, in step S34, the mode is recognized to be a horizontal mode (code 001; route "HORIZONTAL"), a one-dimensional decoding process is carried out by both the code M(a0a1)+M(a1a2) following the code 001 and the MH code table stored in the reference table holding section 17 (step S39). Next, a pixel a2 on the decoding line is detected and the pixel a2 is set as the next start pixel a0 (step S40). The next start pixel a0 employs the color of the previous start pixel a0 (step S41).

When, in step S34, the mode is recognized to be a vertical mode (route "VERTICAL"), a pixel b1 on the reference line relative to the start pixel b0 is first detected (step S42). If the pixel b2 is detected, a decoding process corresponding to the recognized code is carried out (step S43). More specifically, when the recognized code is 1 (V(0)), pixels of the color of a0 are laid down up to but not including the pixel b1 . When the recognized code corresponds to code Vx(n) (where x=r or l and n=1, 2, or 3), pixels of the color of a0 are laid down up to the $n^{th}$ pixel on the x-side (where x=r denotes the right and x=l denote the left) of the pixel b1 . Similarly, then $^{th}$ pixel is not included. Next, the pixel a1 on the decoding line is set as the next start pixel a0 (step S44). The next start pixel a0 employs the color opposite to the color of the previous pixel a0 (step S45).

After step S38, S41, or S45, it is judged whether or not the decoding process has been carried out up to the end of the decoding line (coded data corresponding to this line). That is, it is judged whether or not the decoding position has reached end-of-line (EOL) (step S46). If it has not reached EOL (route "NO" in step S46), the process returns to step S34 and repeatedly carries out the above-mentioned steps S34 to S46.

If it has reached EOL (route "YES" in step S46), it is judged whether or not the decoding process has been executed up to the end of the image data to be decoded. That is, it is judged whether or not the decoding position has reached end-of-data (EOD) (step S47). If it has not reached EOD (route "NO" in step S46), the process returns to step S32 and repeatedly carries out the above-mentioned steps S32 to S47. When it arises, in step 32 the next decoding line is set and the coded data corresponding to the line is read out. In addition, the previous decoding line, as it is, is set as the reference line. If it has reached EOD (route "YES" in step S47), the decoding process ends.

Problems to be solved by the present invention will occur in the case in which data compressed by the above-mentioned MMR coding is decoded and decompressed according to the procedure shown in FIG. 34.

In the case of high-resolution image data, the distance from the start pixel b0 on the reference line to the pixel b1 (or distance from the pixel b1 to the pixel b2) is long, as shown in FIG. 35. The number of bits between these pixels b0, b1, and b2 is considerably increased.

In the conventional data decompressing technique, a processing section, such as a CPU, etc., judges the color of the start pixel b0 and continues to judge each pixel (each bit) until the pixel b1 is detected. If the pixel b1 is detected, the number of judged pixels is calculated as the distance between the pixel b0 and the pixel b1 (see step S42 in FIG. 34).

This procedure will be described in detail with reference to FIG. 35. Note in the figure that a white square denotes a white pixel and a shaded square denotes a black pixel.

First, a bit at which the start pixel b0 is positioned is taken out and the color is judged. In the example shown in FIG. 35, the pixel is judged to be a white pixel. Next, the processing section judges the color of the pixel that is to the right of the pixel b0, and continues to judge the color of each pixel until a black pixel is detected. The pixel at the position where the black pixel is detected becomes the pixel b1 . In the example shown in FIG. 35, the number of pixels (bits) judged to detect the position of the pixel b1 is 20, which denotes the distance between the pixel b0 and the pixel b1.

When detecting not only the pixel b1 but also the pixel b2 (see step S35 in FIG. 34), or when detecting the pixel a1 or a2 from the position of the start pixel a0 after decoding (see step S44 or S40 in FIG. 34), the pixels b2, a1, and a2 are similarly detected while the color of each pixel (bit) is being judged.

Therefore, as the resolution of still image becomes higher, the distance (number of pixels) between pixels b0, b1, and b2 on the reference line, or the distance (number of pixels) between a0, a1, and a2 on the line decoded in the horizontal mode, becomes considerably longer. Because of this, the number of judged bits is increased and the decoding process (decompressing process) is extremely time-consuming.

In step 34 of FIG. 34, when recognizing a coding mode from the code contained in the compressed data, there is also a need to detect the number of consecutive zeros (white pixels) that are present in the data bits of compressed data (coded data). For instance, in the case of 3 consecutive 0s, the coding mode is recognized to be a pass mode. In the case of 2 consecutive 0s, the coding mode is recognized to be a horizontal mode. In the case of 0, or in the case of 4 or 5 consecutive 0s, the coding mode is recognized to be a vertical mode. Thus, when recognizing a coding mode, the number of 0s is detected by judging the color of each bit, as with the case when detecting a color-changed pixel. Therefore, the process of recognizing a coding mode (code) is time-consuming and results in an increase in the time required for the decoding process (decompressing process).

SUMMARY OF THE INVENTION

The present invention has been made in view of the problems mentioned above. Accordingly, the primary object of the present invention is to efficiently detect color-changed pixels on a reference line or coding line and efficiently recognize a coding mode (code), in order to realize the speedup of the process of decompressing binary data compressed, for example, by MMR coding.

To achieve the object of the present invention mentioned above, there is provided a method for decompressing compressed data obtained by coding binary data, which comprises a plurality of data bit lines acquired from an image, for each data bit line, based on both a position of a color-changed pixel on the data bit line and a position of a color-changed pixel on a reference line adjacent to the data bit line. The method comprises the steps of: preparing a table in which, for all bit patterns represented by a predetermined number of data bits, the number of bits, consecutively present to the right or left of a certain bit in each bit pattern and having the same color as the certain bit, is listed; serially taking the predetermined number of reference data bits at a time from a bit sequence forming the reference line; searching the table with both the reference data bits and a position of an attentional bit in the reference data bits, and thereby detecting the number of bits of the same color as the attentional bit which are consecutively present to the right or left of the attentional bit; finding a pixel, right or left away from the attentional bit by a distance equal to the addition of 1 and the detected number of bits, as a color-changed pixel on the reference line; and decoding the compressed data, based on a position of the found color-changed pixel on the reference line.

In a preferred form of the present invention, the compressed data is data coded by modified-modified READ (MMR) coding. Also, the predetermined number of coded data bits is serially taken at a time from a bit sequence forming the compressed data. The aforementioned table is searched with both the coded data bits and a position of an attentional bit in the coded data bits, whereby the number of 0s consecutively present to the right or left of the attentional bit is detected. According to a code corresponding to the detected number of 0s, a coding mode is recognized, and according to the recognized coding mode, the compressed data is decoded.

In another preferred form of the present invention, a bit position in the reference data bits, which corresponds to a position of a start color-changed pixel present on a decoding line obtained by decoding the compressed data, is employed as a position of the attentional bit.

In still another preferred form of the present invention, the predetermined number of decoded data bits is serially taken at a time from a bit sequence forming the decoding line. Also, the aforementioned table is searched with both the decoded data bits and a position of an attentional bit in the decoded data bits, whereby the number of bits of the same color as the attentional bit, which are consecutively present to the right or left of the attentional bit, is detected. The pixel, right or left away from the attentional bit by a distance equal to the addition of 1 and the detected number of bits, is found as a color-changed pixel on the decoding line. The found color-changed pixel on the decoding line is employed as a start color-changed pixel when decoding is performed according to the next code contained in the compressed data.

In accordance with the present invention, there is provided a unit for decompressing compressed data obtained by coding binary data, which comprises a plurality of data bit lines acquired from an image, for each data bit line, based on both a position of a color-changed pixel on the data bit line and a position of a color-changed pixel on a reference line adjacent to the data bit line. The unit comprises a table holding section for storing a table in which, for all bit patterns represented by a predetermined number of data bits, the number of bits, consecutively present to the right or left of a certain bit in each bit pattern and having the same color as the certain bit, is listed; a reference line holding section for holding a reference bit sequence forming the reference line; and a compressed-data holding section for holding a data bit sequence forming the compressed data. The unit further comprises a decompressing section for serially taking the predetermined number of reference data bits at a time from the reference bit sequence, also taking in the data bit sequence from the compressed-data holding section, and decoding the compressed data; and a decoding-line holding section for holing a decoding bit sequence which forms a decoding line obtained by decoding the compressed data with the decompressing section. The decompressing section searches the table with both the reference data bits and a position of an attentional bit in the reference data bits, and thereby detects the number of bits of the same color as the attentional bit which are consecutively present to the right or left of the attentional bit. The decompressing section also finds a pixel, right or left away from the attentional bit by a distance equal to the addition of 1 and the detected number of bits, as a color-changed pixel on the reference line. Furthermore, the decompressing section decodes the compressed data, based on a position of the found color-changed pixel on the reference line, and stores the decoded data in the decoding-line holding section.

According to the present invention, when decompressing binary data compressed by MMR coding, the process of detecting a color-changed pixel on the reference line or decoding line is performed in units of a predetermined number of bits (e.g., 1 byte=8 bits) by employing the aforementioned table. Therefore, the present invention is capable of efficiently detecting color-changed pixels. In addition, the process of recognizing a coding mode (code) is similarly performed in units of a predetermined number of bits (e.g., 1 byte=8 bits) by employing the aforementioned table. Thus, the coding mode can be efficiently recognized.

Thus, the present invention is capable of considerably speeding up the process of decompressing binary data compressed and also considerably shortening the time required for the decompressing process. Particularly, the present invention is extremely effective when employed in the case where image data has high resolution and the space between color-changed pixels is long. Thus, the present invention is capable of considerably shortening the data decompressing time.

BRIEF DESCRIPTION OF THE DRAWINGS

The present invention will be described in further detail with reference to the accompanying drawings wherein:

FIG. 2 is a diagram showing a portion of the first table in which the number of white pixels consecutively present to the right of the pixel of the $x^{th}$ bit in 1 byte of bit sequence is listed for each bit pattern;

FIG. 3 is a diagram showing a portion of the second table in which the number of black pixels consecutively present to the right of the pixel of the $x^{th}$ bit in 1 byte of bit sequence is listed for each bit pattern;

FIG. 4 is a diagram showing a portion of the third table in which the position of a white pixel appearing first in 1 byte of bit sequence is listed for each bit pattern, and a portion of the fourth table in which the position of a black pixel appearing first in 1 byte of bit sequence is listed for each bit pattern;

FIG. 5 is a diagram showing a portion of the fifth table in which the color (white or black) of the pixel of the $x^{th}$ bit in 1 byte of bit sequence is listed for each bit pattern.

DETAILED DESCRIPTION OF THE PREFERRED EMBODIMENTS

The present invention will hereinafter be described in detail with reference to the drawings.

Figure 1:
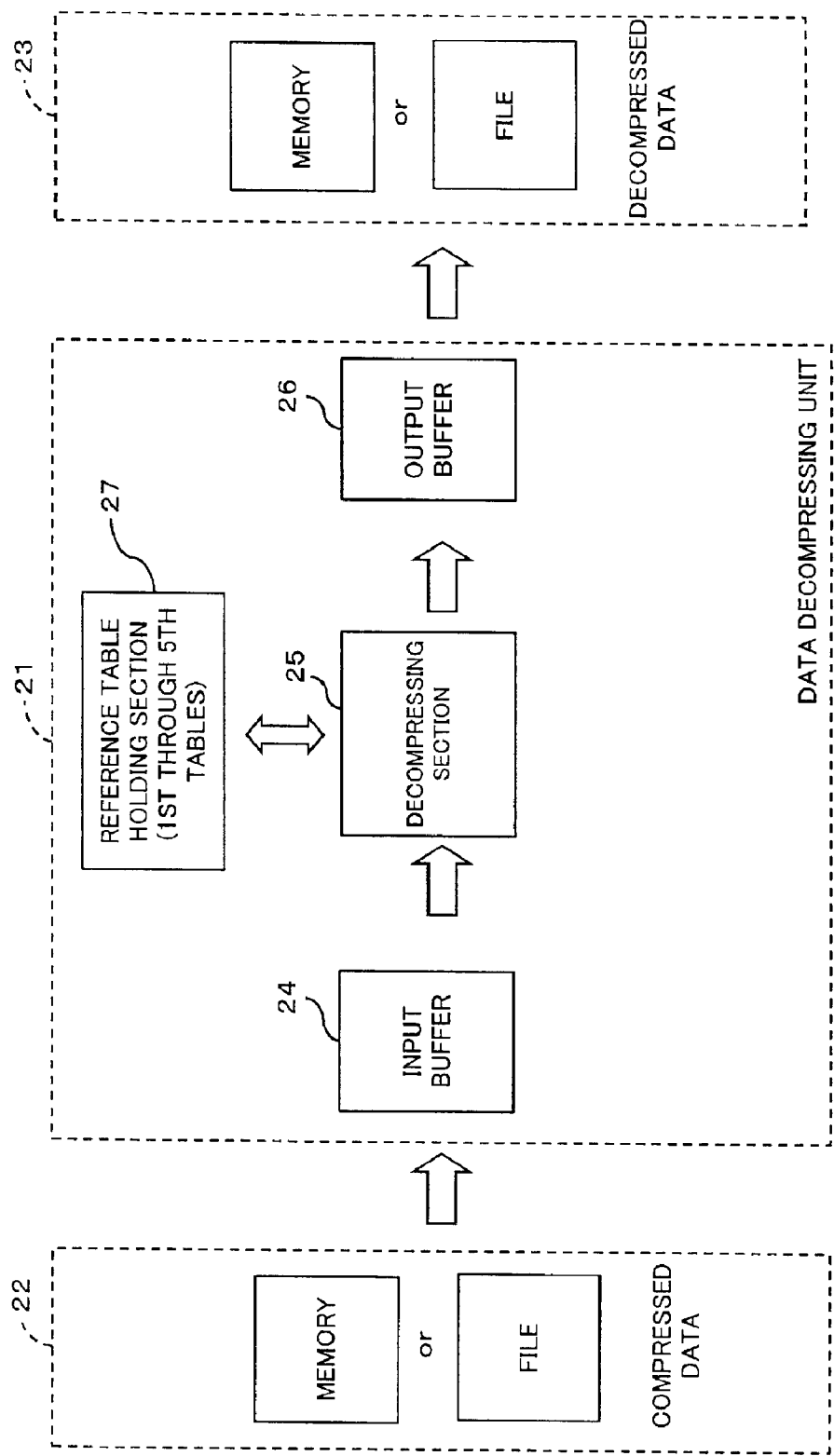
FIG. 1 is a block diagram showing a data decompressing unit constructed according to a preferred embodiment of the present invention.

FIG. 1 schematically shows a data decompressing unit 21 constructed according to a preferred embodiment of the present invention. As shown in the figure, the data decompressing unit 21 of the preferred embodiment is nearly the same as the data decompressing unit 11 shown in FIG. 33. The input side of the data decompressing unit 21 is connected with a compressed data storage section 22 similar to the compressed data storage section 12 shown in FIG. 33. The output side of the data decompressing unit 21 is connected to a decompressed data storage section 23 similar to the decompressed data storage section 13 shown in FIG. 33.

Figure 33:
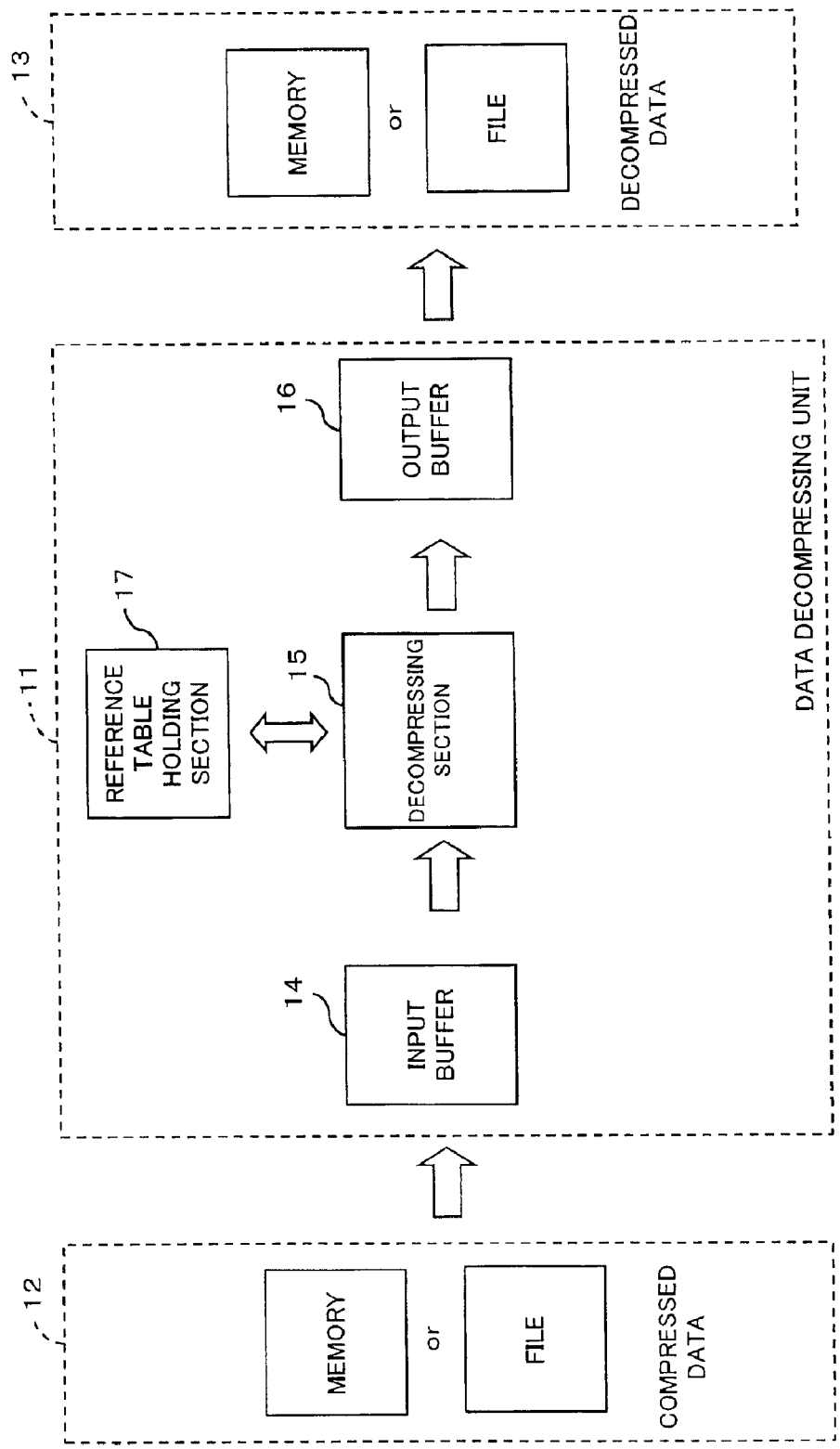
FIG. 33 is a block diagram showing a general data decompressing unit for carrying out the process of decompressing (decoding) data compressed by MMR coding.

The compressed data storage section 22, as with the compressed data storage section 12 shown in FIG. 33, stores image data coded (or compressed) by MMR coding. The decompressed data storage section 23 serially stores image data decoded (or decompressed) by the data decompressing unit 21.

The data decompressing unit 21 is used to expand compressed data (more specifically, data compressed by MMR coding) obtained by coding binary data, which consist of a plurality of lines acquired from an image, based on both the position of a color-changed pixel on each coding line and the position of a color-changed pixel on a reference line adjacent to the coding line. The data decompressing unit 21 is constructed of an input buffer 24, a decompressing section 25, an output buffer 26, and a reference table holding section 27.

The input buffer 24 corresponds to the input buffer 14 shown in FIG. 33, and functions as a compressed-data holding section that temporarily holds a bit sequence that forms compressed data read out from the compressed data storage section 22.

The output buffer 26 corresponds to the output buffer 16 shown in FIG. 33, and functions as a decoding-line holding section which temporarily holds a bit sequence which forms a decoding line obtained by decoding compressed data output from the decoding section 25. The data held in the output buffer 26 is stored in the decompressed data storage section 23 as the decompressed data. The output buffer 26 also functions as a reference line holding section in which a result of the decoding of the line above a decoding line is held as a bit sequence for a reference line.

The reference table holding section 27 corresponds to the reference table holding section 17 shown in FIG. 33. The reference table holding section 27 of the preferred embodiment, in addition to holding an MR code table (two-dimensional code table shown in Table 1) and an MH code table, holds five kinds of tables that are to be described later. Particularly, the first table and the second table are tables in which, for all bit patterns represented by a predetermined number of data bits (in the preferred embodiment, 1 byte or 8 bits), the number of bits, consecutively present to the right of one bit in each bit pattern and having the same color as the one bit, is listed.

The decompressing section 25 corresponds to the decompressing section 15 shown in FIG. 33. The decompressing section 25 of the preferred embodiment serially takes in a predetermined number of reference data bits (1 byte of reference data or 8 bits of reference data) at a time from a bit sequence which forms a reference line held in the output buffer 26; serially takes in a predetermined number of coded data bits (1 byte of coded data or 8 bits of coded data) at a time from a bit sequence forming the compressed data output from the input buffer 24; and decodes the compressed data.

The decompressing section 25 of the preferred embodiment searches the first through the fifth tables held in the reference table holding section 27 with both the reference data bits and the position of an attentional bit (b0 or b1) in the reference data bits; detects the number of bits of the same color as the attentional bit which are consecutively present to the right of the attentional bit; finds the pixel, which is right away from the attentional bit by a distance equal to the addition of 1 bit and the detected number of bits, as a pixel b1 or b2 on the reference line; decodes compressed data, based on the position of the found pixel b1 or b2; and stores the decoded data in the output buffer 26.

The decompressing section 25 also recognizes a coding mode according to a code contained in the compressed data, and decodes the compressed data according to the recognized mode (pass mode, horizontal mode, or vertical mode). More specifically, the decompressing section 25 of the preferred embodiment serially takes 1 byte (8 bits) of coded data at a time from a bit sequence forming the compressed data; searches the first table held in the reference table holding section 27 with both the taken data bits and the position of an attentional bit in the coded data bits; detects the number of 0s which lie consecutively to the right of the attentional bit; and recognizes a coding mode according to a code which corresponds to the detected number of 0s.

The decompressing section 25 detects the position of a bit in reference data bits (i.e., a start pixel b0 on a reference line), taken from the reference line, which corresponds to the bit position of a start pixel a0 on a decoding line which is obtained by decoding compressed data. The decompressing section 25 employs the detected bit position as the position of the aforementioned attentional bit.

Furthermore, the decompressing section 25 serially takes a predetermined number of coded data bits (1 byte of coded data or 8 bits of coded data) at a time from a bit sequence forming a decoding line held in the output buffer 26; searches the first through the fifth tables held in the reference table holding section 27 with both the taken data bits and an attentional bit (pixel a0 or a1) in the taken data bits; detects the number of bits of the same color as the attentional bit which are consecutively present to the right of the attentional bit; finds the pixel, which is right away from the attentional bit by a distance equal to the addition of 1 bit and the detected number of bits, as a pixel a2 on the decoding line; and employs the found pixel a2 as a start pixel a0 when decoding is performed based on the next code contained in the compressed data.

The above-mentioned decompressing section 25 is realized by dedicated software (data decompressing program). This data decompressing program is recorded on a computer-readable storage medium such as a flexible disk, a CD-ROM, etc. In the preferred embodiment, the data decompressing program is previously stored in a read-only memory (ROM; not shown) which forms a portion of the data decompressing unit 21, and is read out and carried out by a central processing unit (computer; not shown) forming a portion of the data decompressing unit 21. In this manner, the above-mentioned functions of the decompressing section 25 are realized.

The first through the fifth tables to be described later are provided in a data decompressing program and read out from the data decompressing program to the reference table holding section 27. In this manner, the first through the fifth table are used.

Note that a contents-delivery program may be stored in a storage unit (storage medium) such as a magnetic disk, an optical disk, a magneto-optic disk, etc., and may be delivered from the storage unit to a computer via a communication line.

In addition, the above-mentioned input buffer 24, output buffer 26, and reference table holding section 27 are realized by a random access memory (not shown) forming a portion of the data decompressing unit 21, or by a storage unit such as a hard-disk drive (or an external storage unit).

Figure 35:
FIG. 35 is a diagram showing pixels on a reference line in the case of high-resolution image data.

In the conventional data decompressing method, as described in FIG. 35, the positions of pixels a1, a2, b1, and b2 on the decoding line and reference line are detected by judging the color of each bit (pixel) on the two lines.

On the other hand, in the data decompressing method of the preferred embodiment, the search for pixels a1, a2, b1, and b2 is not performed in units of 1 bit. That is, a pixel line (decoding line or reference line), consisting of white bits (0s) and black bits (1s), is divided into blocks of 1 byte. Each block consisting of white and black bits (i.e., each bit pattern) is detected, and based on the detected bit pattern, the bit-pattern tables (the first through the fifth tables) held in the reference table holding section 27 are searched. In this manner, the search for pixels a1, a2, b1, and b2 is performed in units of 1 byte.

When a pixel line is divided into blocks of 1 byte (8 bits), patterns consisting of white and black pixels can be obtained. When it arises, there are 256 patterns consisting of white and black pixels. For example, assuming that 1 pixel is 1 bit and that a white pixel is 0 and a black pixel is 1, 256 8-bit patterns can be generated.

The preferred embodiment employs five tables to find the position of a color-changed pixel. The five tables are:

(a) the first table W[8][256] in which the number of white pixels consecutively present to the right of the pixel of the $x^{th}$ bit (attentional bit) in 1 byte of bit sequence is listed for each bit pattern;

(b) the second table B[8][256] in which the number of black pixels consecutively present to the right of the pixel of the $x^{th}$ bit (attentional bit) in 1 byte of bit sequence is listed for each bit pattern;

(c) the third table LW[256] in which the position of a white pixel appearing first in 1 byte of bit sequence is listed for each bit pattern;

(d) the fourth table LB[256] in which the position of a black pixel appearing first in 1 byte of bit sequence is listed for each bit pattern; and (e) the fifth table CLR[8][256] in which the color (white or black) of the pixel of the $x^{th}$ bit in 1 byte of bit sequence is listed for each bit pattern.

FIG. 2 shows a portion of the first table W[8][256]. Since the number of 8-bit patterns of 0s and 1s is 256 in all, the first table W[8][256] lists 256 bit patters in the vertical direction thereof, as shown in FIG. 2. In the lateral direction of the first table W[8][256], the number of white pixels consecutively present to the right of the pixel of the $x^{th}$ bit in 1 byte of bit sequence is listed for each bit pattern.

Note that the first column (NO.) of the first table W[8][256] lists the decimal numbers 0 through 255 equivalent to binary numbers representing bit patterns.

In addition, in the first table W[8][256], the positions of the 8 bits in each bit pattern are represented from left to right by 0, 1, 2, 3, 4, 5, 6, and 7, respectively. That is, the first pixel in each bit pattern corresponds to the pixel of the $0^{th}$ bit (x=0) and the eighth pixel corresponds to the pixel of the $7^{th}$ bit (x=7).

For the number of white pixels in the first table W[8][256], the pixel of the $x^{th}$ bit is not counted. For example, in the bit pattern NO. 0, the number of white pixels consecutively present to the right of the pixel of the $0^{th}$ bit (x=0) is 7 (=W[0][0]) and the number of white pixels consecutively present to the right of the pixel of the $3^{rd}$ bit (x=3) is 4 (=W[3][0]). In the bit pattern NO. 4, the number of white pixels consecutively present to the right of the pixel of the $4^{th}$ bit (x=4) is 0 (=W[4][4]) because there is no white pixel, and the number of white pixels consecutively present to the right of the pixel of the $3^{rd}$ bit (x=3) is 4 (=W[3][0]). The pixel of the $5^{th}$ bit (x=5) is black, but one white pixel is present to the right of this pixel. Therefore, the number of white pixels in this case is 1 (=W[5][4]).

FIG. 3 shows a portion of the second table B[8][256]. The second table B[8][256] is generated in the same manner as the first table W[8][256] except that, in the lateral direction of the second table B[8][256], the number of black pixels consecutively present to the right of the pixel of the $x^{th}$ bit in 1 byte of bit sequence is listed for each bit pattern. Since the second table B[8][256] is employed in the same manner as the first table W[8][256], a detailed description thereof is omitted.

FIG. 4 shows a portion of the third table LW[256] and a portion of the fourth table LB[256]. In the third table LW[256], the position of a white pixel that appears first in 1 byte of bit sequence is listed for each bit pattern. In the fourth table LB[256], the position of a black pixel that appears first in 1 byte of bit sequence is listed for each bit pattern. In these tables LW[256] and LB[256], as with the first table W[8][256] and the second table B[8][256], 256 bit patterns are listed in the vertical direction.

However, the third table LW[256] and the fourth table LB[256] differ from the first table W[8][256] and the second table B[8][256] in that the positions of 8 bits in each bit pattern are represented from left to right by 1, 2, 3, 4, 5, 6, 7, and 8. That is, in the third table LW[256] and the fourth table LB[256], when the position of the first white pixel or black pixel is 1, the pixel is positioned at the first bit on the bit pattern. When the pixel position is 8, the pixel is positioned at the $8^{th}$ bit.

For instance, in the bit pattern NO. 0, all the 8 bits are white pixels and the first bit is a white pixel. Therefore, the value of the third table LW[256] corresponding to the bit pattern NO. 0 is 1 (=LW[0]). On the other hand, the value of the fourth table LB[256] corresponding to the bit pattern NO. 0 is 0 (=LB[0]) because there is no black pixel. Furthermore, in the bit pattern NO. 4, only the pixel of the $5^{th}$ bit (the sixth bit from left) is black. Therefore, the value of the third table LW[256] corresponding to the bit pattern NO. 4 is 1 (=LW[4]), while the value of the fourth table LB[256] corresponding to the bit pattern NO. 4 is 6 (=LB[4]).

FIG. 5 shows a portion of the fifth table CLR[8][256]. In the fifth table CLR[8][256], as shown in the figure, 256 bit patterns are listed in the vertical direction, and in the lateral direction, the color (white (0) or black (1)) of the pixel of the $x^{th}$ bit in 1 byte of bit sequence is listed for each bit pattern.

For example, in the bit pattern NO. 0, all the 8 bits are white pixels, and the value of the fifth table CLR[8][256] is 0 (=CLR[x][0]) because all the bits are white (0). In addition, in the bit pattern NO. 4, only the pixel of the $5^{th}$ bit is black and therefore the value of the fifth table CLR[8][256] corresponding to the bit pattern NO. 4 is 1 (=CLR[5][4]) at the $5^{th}$ bit (x=5) and 0 at the other bit positions (x=0, 1, 2, 3, 4, 6, and 7).

In the preferred embodiment, the first through the fifth tables are previously stored in the reference table holding section 27. In the decompressing section 25, in order to detect the positions of pixels a1, a2, b1, and b2, one of the tables is properly used depending on whether an attentional bit (attentional pixel) is white or black.

Now, an example of a pixel detecting method in the preferred embodiment will be described with reference to FIGS. 28 and 35.

Figure 28:
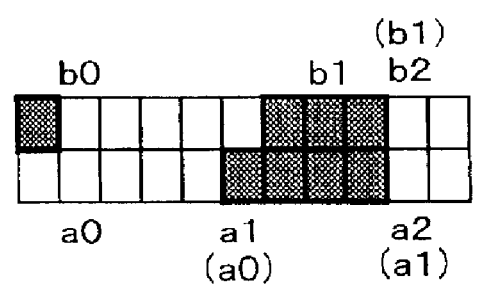
FIG. 28 is a diagram showing two pixel lines used for explaining MMR coding.
Figure 29:
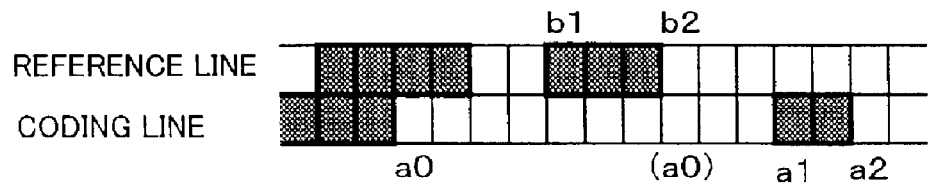
FIG. 29 is a diagram showing two pixel lines used for explaining MMR coding (pass mode)
Figure 30:
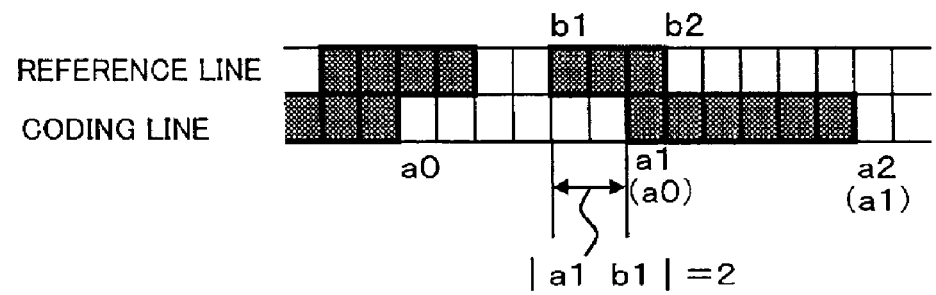
FIG. 30 is a diagram showing two pixel lines used for explaining MMR coding (vertical mode)
Figure 31:
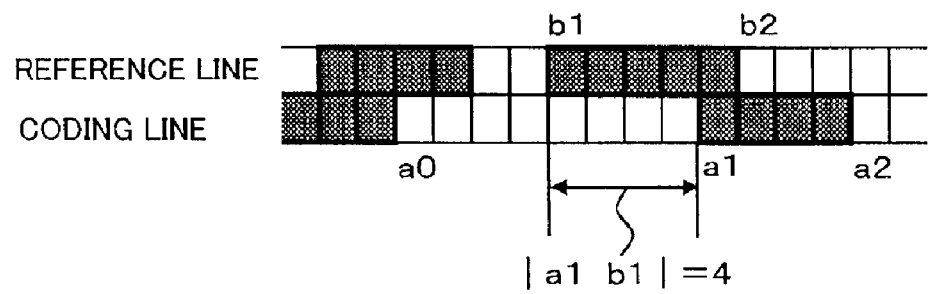
FIG. 31 is a diagram showing two pixel lines used for explaining MMR coding (horizontal mode)
Figure 32:
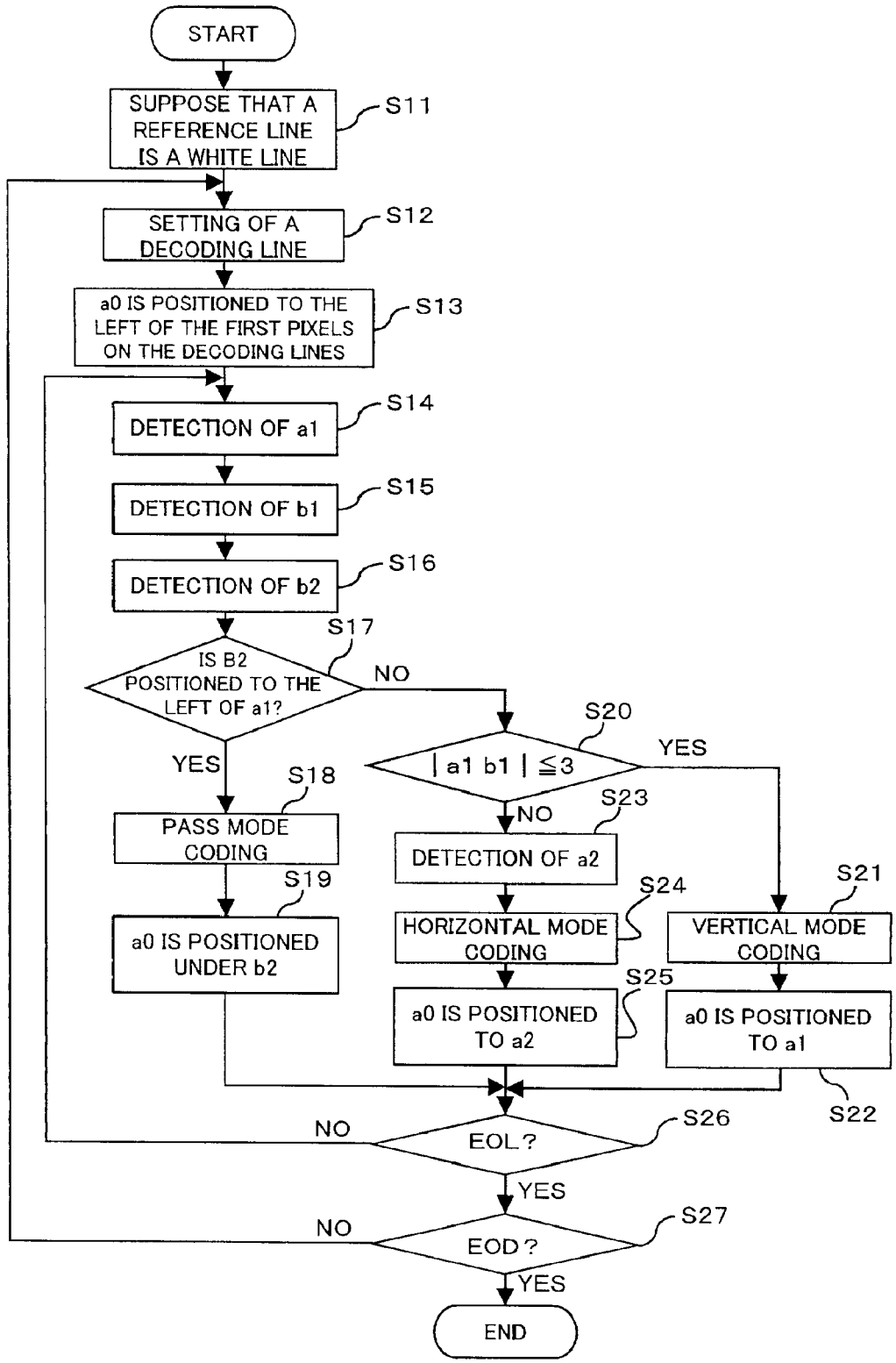
FIG. 32 is a flowchart used to explain an MMR coding procedure (compressing procedure) that is carried out by the unit shown in FIG. 27.

First, a description will be given in the case where the pixel b1 on the reference line shown in FIG. 28 is detected. On the reference line, b0 and b1 are present in the first 1 byte. The bit pattern of the first 1 byte is 10000011 and the start pixels a0 and b0 are white pixels (0).

Hence, the bit pattern 10000011 is searched for by using the first table W[8][256]. Since this bit pattern 10000011 is equivalent to a decimal number 131, reference is made to the NO. 131 of the first table W[8][256]. Next, since the start pixel b0 is present at the first bit in FIG. 28, reference is made to the column of the first bit at the row of the NO. 131 of the first table W[8][256]. As a result, 4 (=W[1][131]) is obtained as the number of white pixels in 1 byte which are consecutively present to the right of the pixel b0 (see step 131 of FIG. 11).

Because the start pixel b0 in 1 byte is positioned to the second bit from left, 2+4=6 is obtained, if this position is added to the number of consecutive white pixels obtained from the first table W[8][256]. Thus, it is found that the pixel b1 is present in this 1 byte of data (see the route "NO" in step S132 of FIG. 11). The pixel of the seventh bit (6+1=7) from left in this 1 byte is the pixel b1 that changes from white to black. That is, in 1 byte, the pixel next to the position of the addition of the position of the pixel b0 and the number of consecutive white pixels is employed as the position of the pixel b1 (see step S135 of FIG. 11).

Note that when the start pixels a0 and b0 are both black pixels (1), reference is made to the second table B[8][256], not the first table W[8][256].

Next, a description will be given in the case where the position of the pixel b1 is found when the pixels b0 and b1 are present in different bytes, as shown in FIG. 35. Assume that the start pixels a0 and b0 are both white pixels (0). Also, assume that the pixel b0 is positioned to the second pixel from left in the first 1 byte. That is, the pixel b0 is the pixel of the $1^{st}$ bit (x=1).

In this case, the number of white pixels consecutively present to the right of the start pixel b0 in the first 1 byte is first found by employing the first table W[8][256]. Since the 8 bits in the first 1 byte are all white, bit pattern NO. 0 is employed. If reference is made to the column of the $1^{st}$ bit (x=1) at the row of NO. 0 of the first table W[8][256], the number of white pixels consecutively present to the right of the pixel b0 is 6 (=W[1][0]) (see step S131 of FIG. 11).

Since the pixel b0 is the second bit from left, 2+6=8 is obtained, if the position of the pixel b0 is added to the number of consecutive white pixels obtained from the first table W[8] [256]. Therefore, it is found that the pixel b1 is not present in the first 1 byte (see the route "YES" in step S133 of FIG. 11).

Thereafter, for the next 1 byte, the fourth table LB[256] is searched. However, since the 8 bits of the next 1 byte are all white, bit pattern NO. 0 is employed. If reference is made to the row of the bit pattern NO. 0 of the fourth table LB[256], 0 (=LB[0]) is obtained and therefore it is found that there is no black pixel. That is, there is no color-changed pixel in this 1 byte.

Hence, for the third 1 byte, the fourth table LB[256] is searched. It is found that the bit pattern for the third 1 byte corresponds to bit pattern NO. 7. If reference is made to the row of the bit pattern NO. 7 of the fourth table LB[256], 6 (=LB[7]) is obtained and it is found that a black pixel (color-changed pixel) is present at the sixth position (the $5^{th}$ bit position (x=5)) in this byte (see steps S133 and S134 in FIG. 11).

In this way, until the first black pixel is detected after consecutive white pixels, the reference line is divided into blocks of 1 byte and a search for a bit pattern is made with the first table W[8] [256] and the fourth table LB[256]. If the first black pixel is detected, it is employed as pixel b1. Therefore, the pixel b1 is present at the sixth position from the head of the third 1 byte. In other words, the number of white pixels consecutively present to the right of the start pixel b0 is 6+8+(6−1)=19 and the pixel b1 is the $20^{th}$ pixel from the right of the start pixel b1. In the preferred embodiment, the position (6) of the first black pixel in 1 byte is obtained with the fourth table LB[256], so the position of the pixel b1 relative to the start pixel b0 is obtained as 6+8+6=20.

The present invention has been described with reference to the case in which both of the start pixels a0 and b0 are white (0). However, when the start pixels a0 and b0 are both black (1), reference is made to the second table B[8] [256] and the third table LW[256], not first table W[8] [256] and the fourth table LB[256].

As described above, the preferred embodiment refers to each table according to a bit pattern for each 1 byte, to detect the positions of pixels a1, a2, b1, and b2. Therefore, the preferred embodiment is capable of considerably shortening the processing time, compared with the case in which the detection of a color-changed pixel is performed for each bit.

Figure 6:
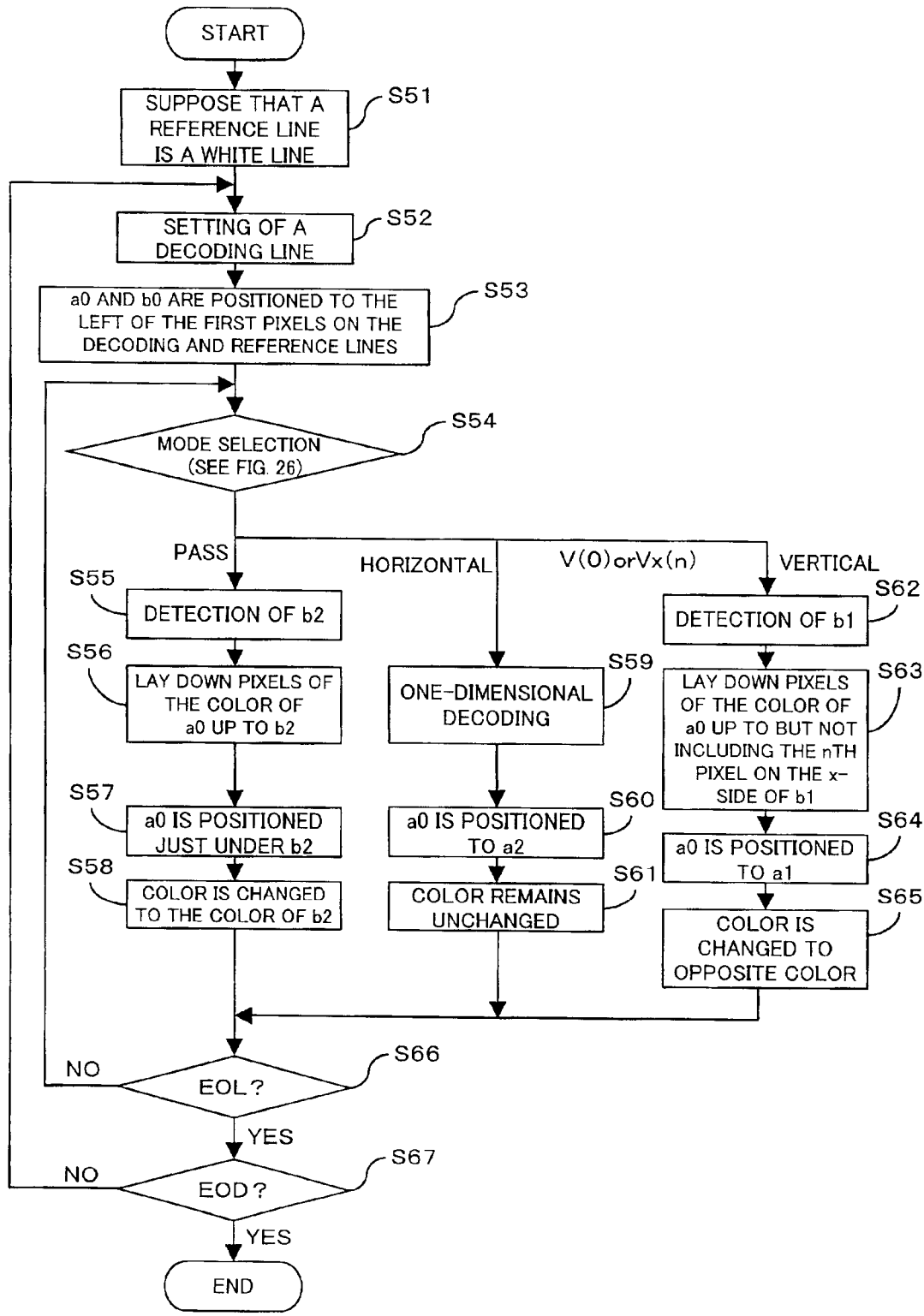
FIG. 6 is a flowchart used to explain a decoding procedure (decompressing procedure) that is performed by the unit shown in FIG. 1.
Figure 34:
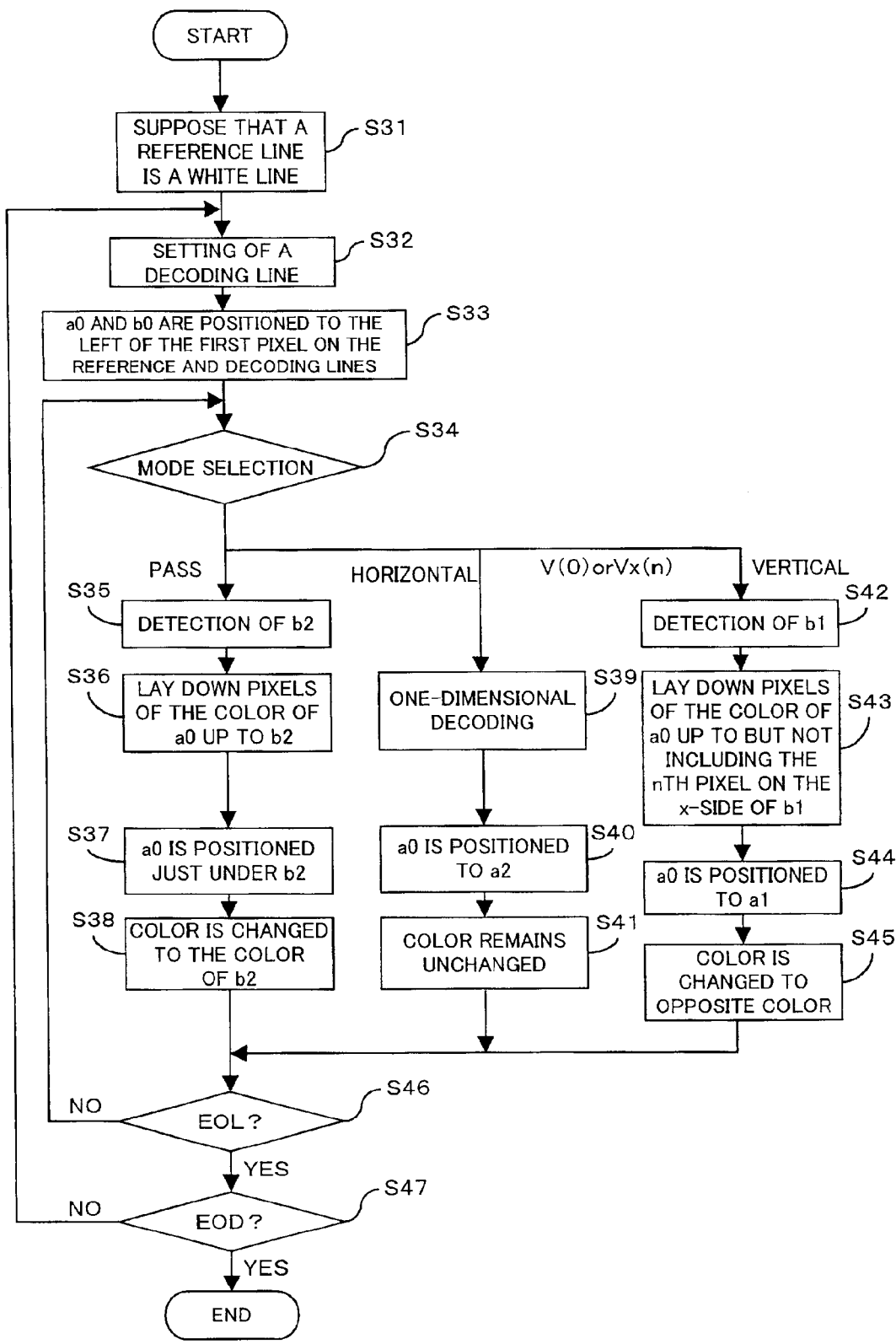
FIG. 34 is a flowchart used for explaining a decoding procedure (decompressing procedure) that is performed by the unit shown in FIG. 33.

Next, the decoding procedure (decompressing procedure) in the decompressing section 25 of the data decompressing unit 21 of the preferred embodiment will be described according to a flowchart (steps S51 to S67) shown in FIG. 6. The decoding procedure in the preferred embodiment is performed basically in the same manner as the decoding procedure in the decompressing section 15 shown in FIG. 34. Steps S51 to S67 in FIG. 6 correspond to steps S31 to S47 shown in FIG. 34, respectively.

First, suppose the pixels on a reference line are all white (step S51). Then, the first decoding line is set (step S52) and the start pixels a0 and b0 are positioned as virtual white pixels to the left of the first pixel on the decoding line and the left of the first pixel on the reference line (step S53).

1 byte of coded data (compressed data) corresponding to the decoding line is serially read out at a time from the head thereof, and the coding mode is recognized and selected according to both the code in the coded data bits and the two-dimensional code table (see Table 1) held in the reference table holding section 27 (step S54).

As described later with reference to FIGS. 22 to 25, the number of 0s consecutively present to the right of an attentional bit is detected by searching the first table W[8] [256] and the fifth table CLR[8] [256], using both the coded data bits and the position of the attentional bit in the coded data bits. The coding mode is recognized according to a code that corresponds to the detected number of 0s.

For instance, when it is recognized by the fifth table CLR[8] [256] that an attentional bit is 0, and the number of 0s consecutively present to the right of the attentional bit is 0, it is judged that the number of 0s consecutively present from the position of the attentional bit is 1 and it is recognized that the coding mode is a vertical mode corresponding to either symbolic code Vr(1) or symbolic code Vl(1). Then, by recognizing by the fifth table CLR[8] [256] whether the two bits following 0 is 11 or 10, the coding mode is specified to either symbolic code Vr(1) or symbolic code Vl(1). The bit next to the currently recognized code 011 or 010 is set as the next attentional bit.

In addition, when it is recognized by the fifth table CLR[8] [256] that an attentional bit is 0, and the number of 0s consecutively present to the right of the attentional bit is 3, it is judged that the number of 0s consecutively present from the position of the attentional bit is 4 and it is recognized that the coding mode is a vertical mode corresponding to either symbolic code Vr(2) or symbolic code Vl(2). Then, by recognizing by the fifth table CLR[8] [256] whether the two bits following 0 is 11 or 10, the coding mode is specified to either symbolic code Vr(2) or symbolic code Vl(2). The bit next to the currently recognized code 000011 or 000010 is set as the next attentional bit.

Similarly, when it is recognized by the fifth table CLR[8] [256] that an attentional bit is 0, and the number of 0s consecutively present to the right of the attentional bit is 4, it is judged that the number of 0s consecutively present from the position of the attentional bit is 5 and it is recognized that the coding mode is a vertical mode corresponding to either symbolic code Vr(3) or symbolic code Vl(3). Then, by recognizing by the fifth table CLR[8] [256] whether the two bits following 0 is 11 or 10, the coding mode is specified to either symbolic code Vr(3) or symbolic code Vl(3). The bit next to the currently recognized code 0000011 or 0000010 is set as the next attentional bit.

When it is recognized by the fifth table CLR[8] [256] that an attentional bit is 0, and the number of 0s consecutively present to the right of the attentional bit is 2, it is judged that the number of 0s consecutively present from the position of the attentional bit is 3 and it is recognized that the coding mode is a pass mode. The bit next to the currently recognized code 00001 is set as the next attentional bit.

When it is recognized by the fifth table CLR[8] [256] that an attentional bit is 0, and the number of 0s consecutively present to the right of the attentional bit is 1, it is judged that the number of 0s consecutively present from the position of the attentional bit is 2 and it is recognized that the coding mode is a horizontal mode. The bit next to the currently recognized code 001+M(a0a1)+M(a1a2) is set as the next attentional bit.

When it is recognized by the fifth table CLR[8] [256] that an attentional bit is 1, it is recognized that the coding mode is a horizontal mode corresponding to code V(0). The bit next to the currently recognized code 1 is set as the next attentional bit.

Figure 26:
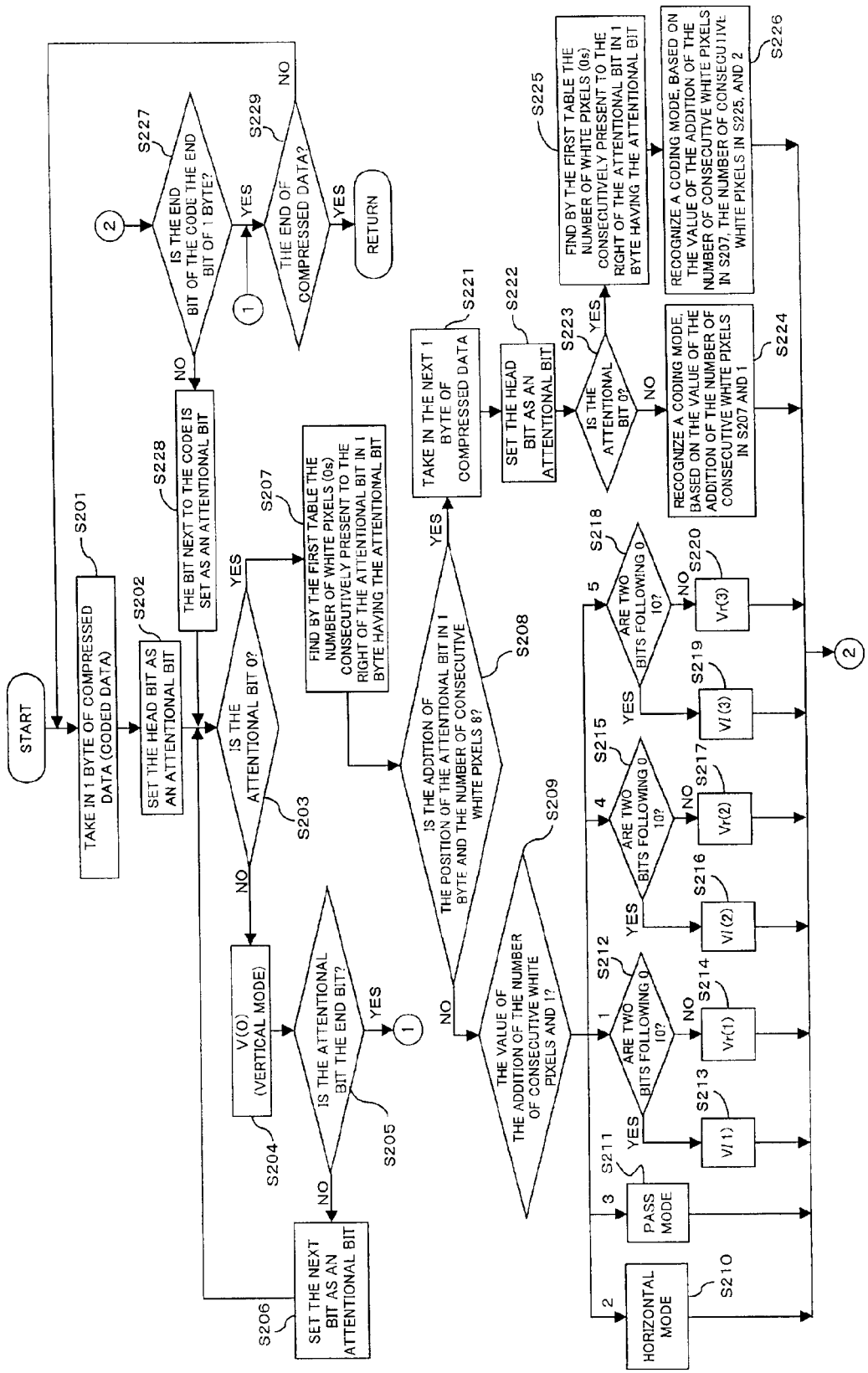
FIG. 26 is a flowchart used for explaining a recognizing and selecting procedure for a coding mode that is carried out in step 54 of FIG. 6.
Figure 27:
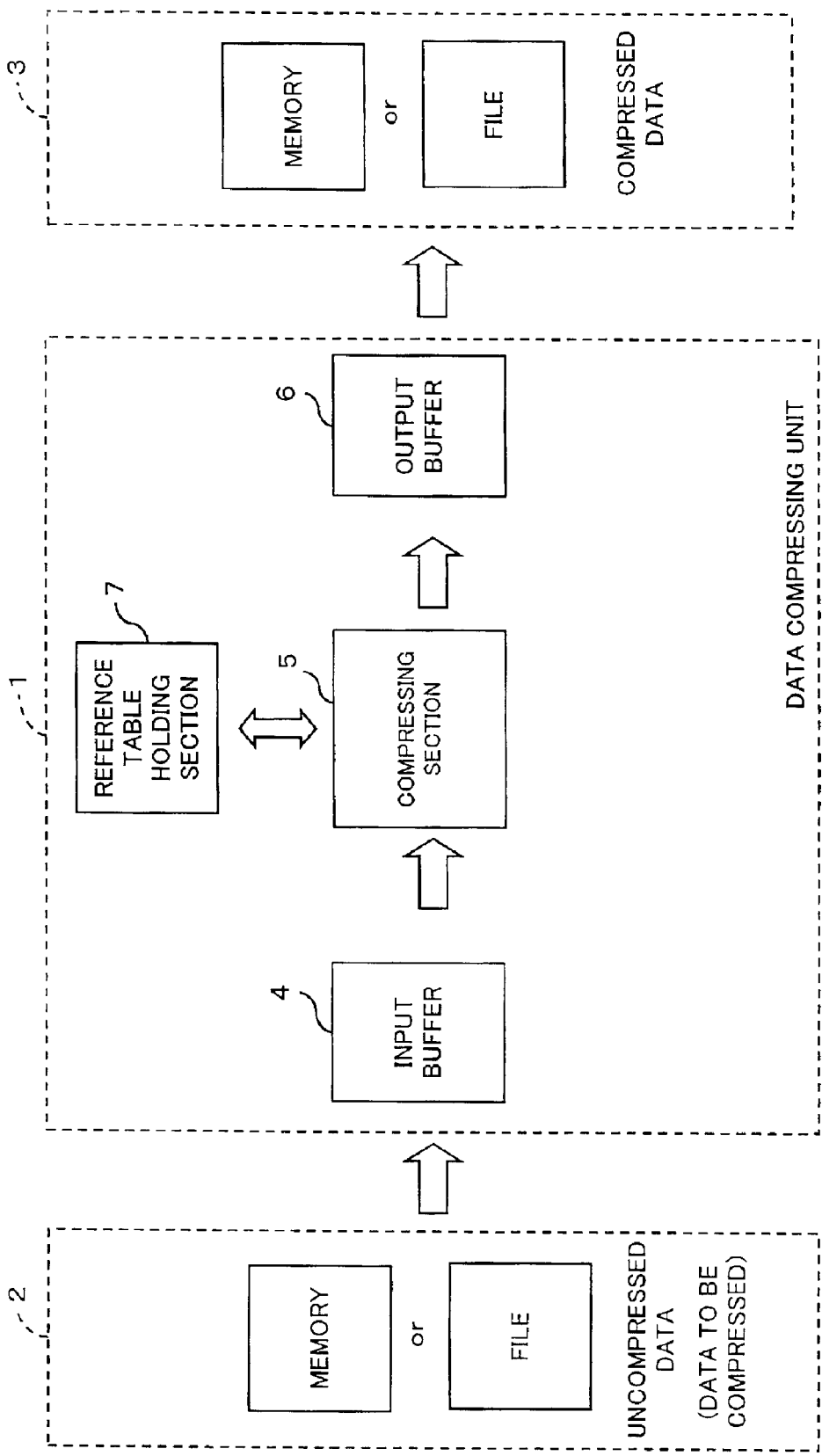
FIG. 27 is a block diagram showing a general data compressing unit for executing a data compression process by MMR coding.

Note that the aforementioned coding-mode recognizing-selecting procedure will be described later with reference to FIG. 26.

When, in step S54, the coding mode is recognized to be a pass mode (code 0001; route "PASS"), a pixel b2 on the reference line relative to a start pixel b0 is first detected (step S55). The procedure of detecting the pixel b2 in step S55 will be described later with reference to FIGS. 8 to 16. If the pixel b2 is detected, pixels of the color of a0 are laid down on the decoding line up to the position of the pixel b2, whereby a decoding process corresponding to the pass mode is carried out (step S56). Next, the pixel on the decoding line that is just under the pixel b2 is set as the next start pixel a0 (step S57). The color of the next start pixel a0 is set to the color of the pixel b2 (step S58).

When, in step S54, the decoding mode is recognized to be a horizontal mode (code 001; route "HORIZONTAL"), a one-dimensional decoding process is carried out by both the code M(a0a1)+M(a1a2) following the code 001 and the MH code table stored in the reference table holding section 27 (step S59). Next, a pixel a2 on the decoding line is detected and the pixel a2 is set as the next start pixel a0 (step S60). The procedure of detecting the pixel a2 in step S60 will be described later with reference to FIGS. 17 to 21. The next start pixel a0 employs the color of the previous start pixel a0 (step S61).

When, in step S54, the decoding mode is recognized to be a vertical mode (route "VERTICAL"), a pixel b1 on the reference line relative to the start pixel b0 is first detected (step S62). The procedure of detecting the pixel b1 in step S62 will be described later with reference to FIG. 7 and FIGS. 9 to 16. If the pixel b1 is detected, a decoding process corresponding to the recognized mode is carried out (step S63). More specifically, when the recognized code is 1 (symbolic code V(0)), pixels of the color of a0 are laid down up to but not including the pixel b1 . When the recognized code corresponds to symbolic code Vx(n) (where x=r or l and n=1, 2, or 3), pixels of the color of a0 are laid down up to the $n^{th}$ pixel on the x-side (where x=r denotes right and x=l denotes left) of the pixel b1 . Similarly, the $n^{th}$ pixel is not included. Next, the pixel a1 on the decoding line is set as the next start pixel a0 (step S64). The next start pixel a0 employs the color opposite to the color of the previous pixel a0 (step S65).

After step S58, S61, or S65, it is judged whether or not the decoding process has been carried out up to the end of the decoding line (coded data corresponding to this line). That is, it is judged whether or not the decoding position has reached end-of-line (EOL) (step S66). If it has not reached EOL (route "NO" in step S66), the process returns to step S54 and repeatedly carries out the above-mentioned steps S54 to S66.

If it has reached EOL (route "YES" in step S66), it is judged whether or not the decoding process has been executed up to the end of the image data to be decoded. That is, it is judged whether or not the decoding position has reached end-of-data (EOD) (step S67). If it has not reached EOD (route "NO" in step S67), the process returns to step S52 and repeatedly carries out the above-mentioned steps S52 to S67. When it arises, in step 52 the next decoding line is set and the coded data corresponding to the line are read out. In addition, the previous decoding line, as it is, is set as the reference line. If it has reached EOD (route "YES" in step S67), the decoding process ends.

Now, an example of the data decompressing procedure in the preferred embodiment will be described with reference to FIGS. 22 to 25. Note that FIGS. 22 to 25 show examples of pixel sequences used to explain the decoding process (decompressing process) of the preferred embodiment.

FIGS. 22 to 25 show the situations in decoding compressed data (coded data) "000101010001 . . . " by employing the reference data bits (reference line shown in each figure). The compressed data (coded data) "000101010001 . . . " is separated into 4 coding modes: pass mode 0001, vertical mode 010 (symbolic code Vl(1)), vertical mode 1 (symbolic code V(0) and pass mode 0001.

In the preferred embodiment, 1 byte of compressed data is taken in at a time. First, compressed data 00010101 is input to the decompressing section 25. Then, the head bit is set as an attentional bit. In step S54 of FIG. 6, as noted before, a coding mode corresponding to each code is recognized.

A bit pattern for the compressed data 00010101 corresponds to NO. 21, and the current attentional bit is at the $0^{th}$ bit position (x=0). Therefore, if reference is made to the column of the $0^{th}$ bit at the row of NO. 21 of the fifth table CLR[8][256] (CLR[0][21]), the pixel color of the $0^{th}$ bit is white (0). Next, if reference is made to the column of the $0^{th}$ bit at the row of NO. 21 of the first table W[8][256] (W[0][21]), the number of 0s consecutively present to the right of the current attentional bit (white) is 2. Therefore, it is judged that 3 consecutive 0s are present from the position of the attentional bit, and it is recognized that the coding mode is a pass mode. Next, the bit next to the currently recognized code 0001, that is, the bit at the fifth position ($4^{th}$ bit position) is set as the next attentional bit.

Since the set attentional bit is at the $4^{th}$ bit position, the pixel color at the $4^{th}$ bit position is white (0), if reference is made to the column of the 4 bit at the row of NO. 21 of the fifth table CLR[8][256] (CLR[4][21]). Next, if reference is made to the column of the $4^{th}$ bit at the row of NO. 21 of the first table W[8][256] (W[4][21]), the number of 0s consecutively present to the right of the current attentional bit (white) is 1. Therefore, it is judged that the bit next to the current attentional bit is 1 and that the number of 0s is only 1 (attentional bit). Also, it is recognized that the coding mode is a vertical mode corresponding to either code Vr(1) or code Vl(1). Next, whether the bit two away from the attentional bit (i.e., the $6^{th}$ bit position) is 0 or 1 is judged by the fifth table CLR[8][256]. That is, if reference is made to the column of the $6^{th}$ bit at the row of NO. 21 of the fifth table CLR[8][256] (CLR[6][21]), the pixel color of the $6^{th}$ bit is white (0). As a result, it is recognized that the coding mode is a vertical mode corresponding to symbolic code Vl(1) (code 010). Next, the bit next to the currently recognized code 010, that is, the bit at the eighth position ($7^{th}$ bit position) is set as the next attentional bit.

Since the set attentional bit is at the $7^{th}$ bit position, the pixel color of the $7^{th}$ bit is black (1), if reference is made to the column of the $7^{th}$ bit at the row of NO. 21 of the fifth table CLR[8][256] (CLR[7][21]). Therefore, it is recognized that the coding mode is a vertical mode corresponding to symbolic code V(0). Next, the bit next to the currently recognized code 1 is set as the next attentional bit. At this stage, the process of recognizing 1 byte of compressed data is completed. Thereafter, the next 1 byte of compressed data "0001 . . . " is read in and the head bit of the compressed data bits is set as an attentional bit. Next, in the same manner as the aforementioned, the coding mode is recognized to be a pass mode.

Figure 22:
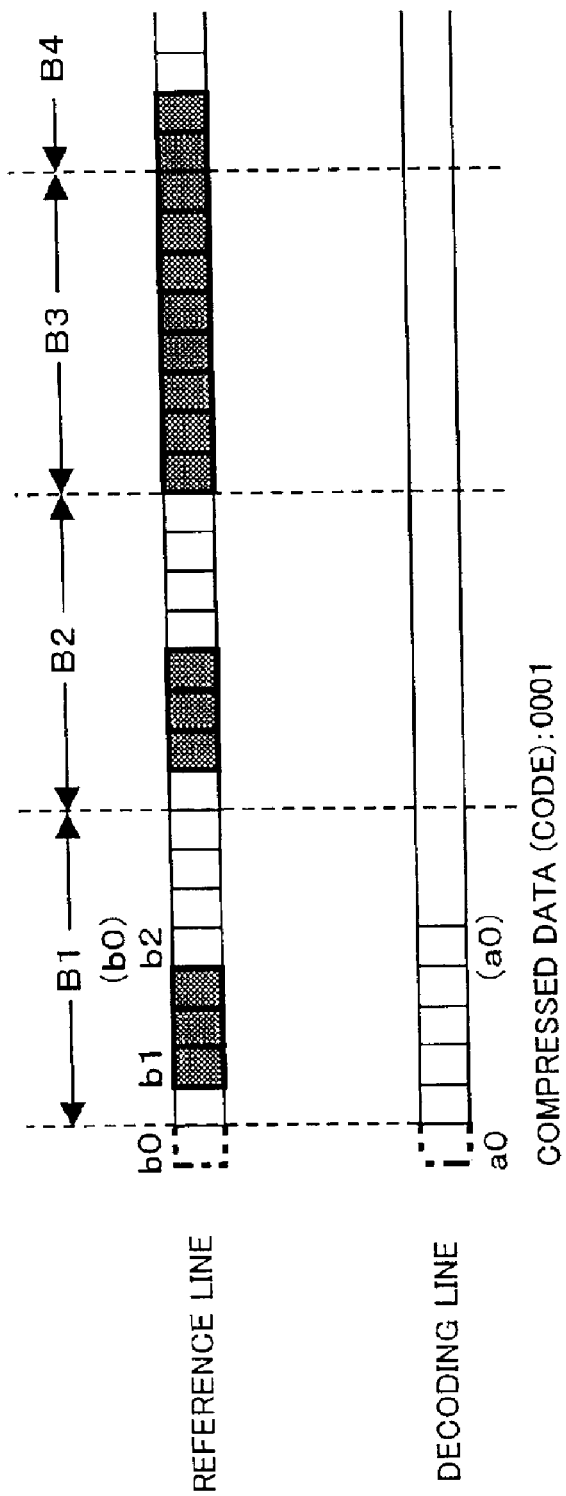
FIGS. 22 to 25 are diagrams showing examples of pixel sequences used to explain a decoding process (decompressing process) that is carried out by the preferred embodiment.

As shown in FIG. 22, the first start pixel b0 on the reference line is set as a virtual white pixel to the left of the first pixel. Similarly, the first start pixel a0 on the decoding line is set as a virtual white pixel to the left of the first pixel. Because the first code is 0001, the coding mode is recognized to be a pass mode. As shown in FIG. 22, the start pixels b0 and a0 are white. Therefore, the position of the pixel b2 in the first byte B1 on the reference line (the fifth bit from the left of the first byte B1) is detected according to steps S75 and S80 of FIG. 8 (i.e., flowcharts shown in FIGS. 11 and 15), and pixels of the color (white) of the start pixel a0 are laid down up to the position of the pixel b2. Thereafter, the pixel on the decoding line which is just under the pixel b2 is set as the next start pixel a0, and the color of the start pixel a0 is set to the color (white) of the pixel b2.

Figure 23:
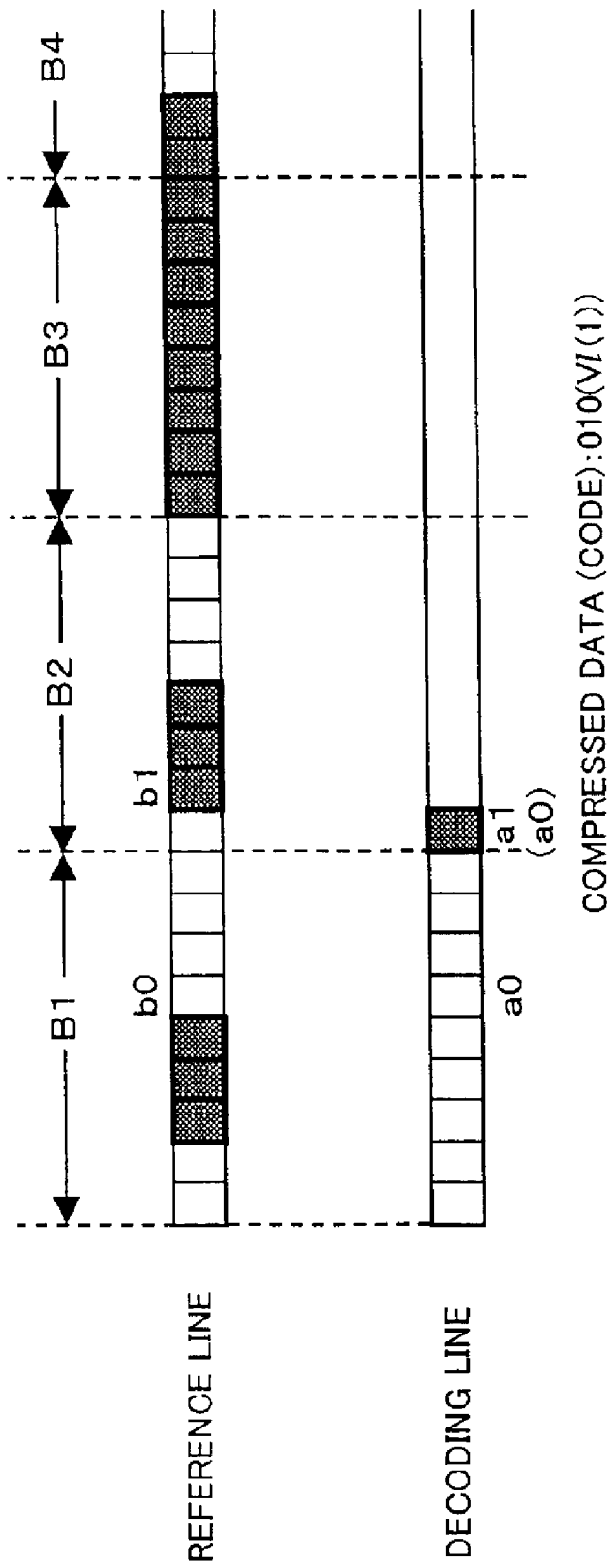

Since the second code is 010, the coding mode is recognized to be a vertical mode corresponding to symbolic code Vl(1). As shown in FIG. 23, the current start pixels b0 and a0 are both white. Therefore, the position of a color-changed pixel b1 in the second byte B2 on the reference line (the second bit from the left of the second byte B2) is detected according to step S75 of FIG. 7 (i.e., a flowchart shown in FIG. 11), and pixels of the color (white) of the start pixel a0 are laid down up to the position immediately before the pixel on the left side (x=1) of the pixel b1 (i.e., the position of the rightmost bit of the first byte B1). Thereafter, a color-changed pixel a1 (the leftmost pixel in the second byte B2) on the decoding line is set as the next start pixel a0. The color of the start pixel a0 is set to the color opposite to the color of the previous start pixel a0, that is, black.

Figure 24:
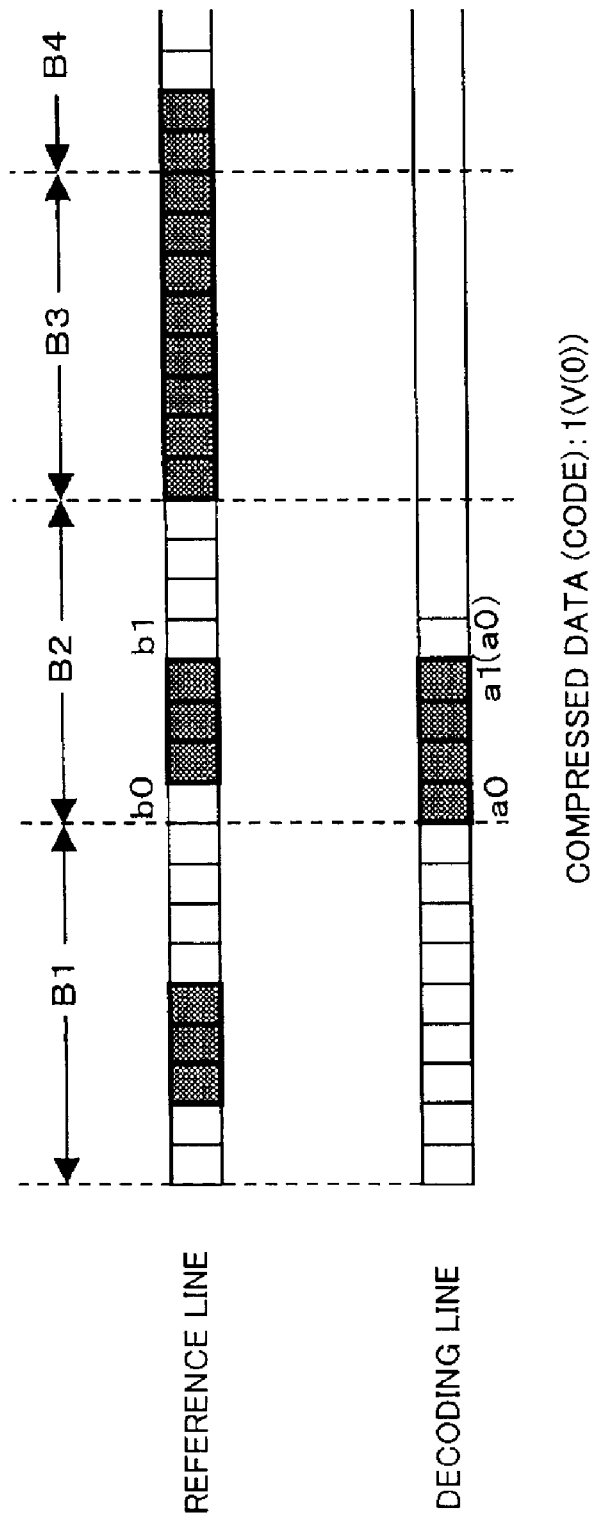

Since the third code is 1, the coding mode is recognized to be a vertical mode corresponding to symbolic code V(0). As shown in FIG. 24, the current start pixels b0 and a0 are white and black, respectively. Therefore, the position of a color-changed pixel b1 in the second byte B2 on the reference line (the fifth bit from the left of the second byte B2) is detected according to steps S77 and S78 of FIG. 7 (i.e., flowcharts shown in FIGS. 12 and 13), and pixels of the color (black) of the start pixel a0 are laid down up to the position immediately before the pixel b1 (i.e., the fourth bit of the second byte B2) Thereafter, a color-changed pixel a1 (the fifth pixel from the left of the second byte B2) on the decoding line is set as the next start pixel a0. The color of the start pixel a0 is set to the color opposite to the color (black) of the previous start pixel a0, that is, white.

Figure 25:
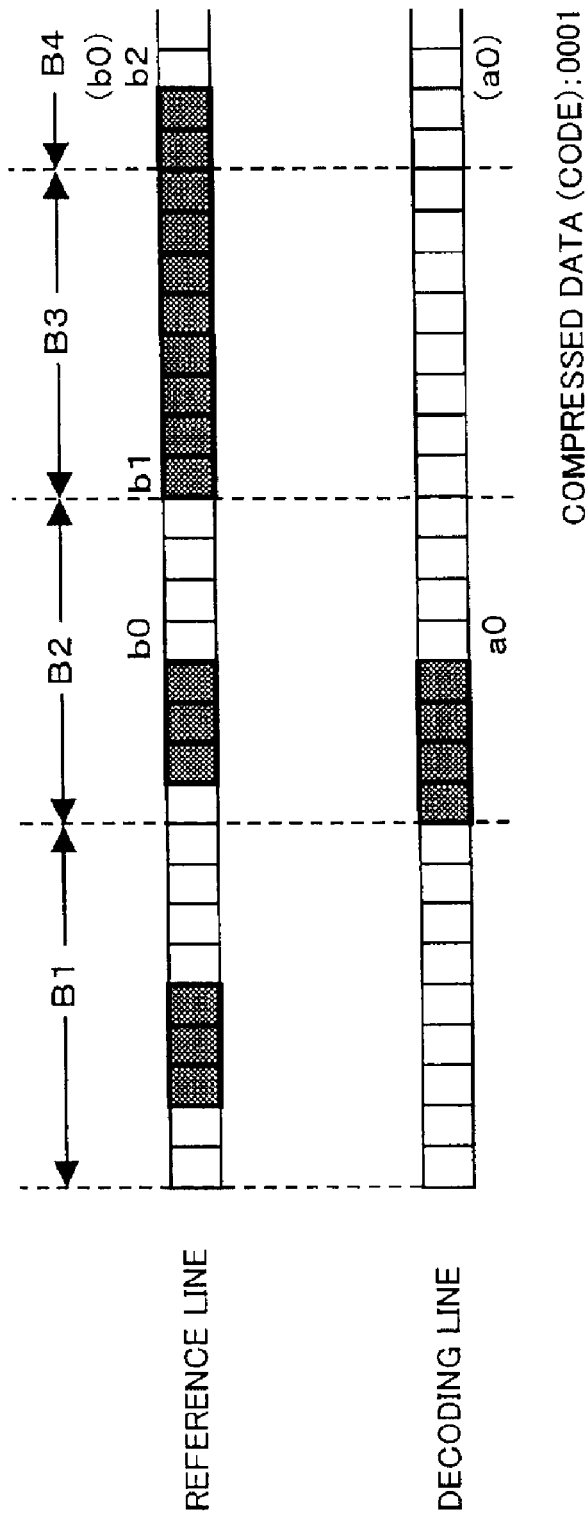

Since the fourth code is 0001, the coding mode is recognized to be a pass mode. As shown in FIG. 25, the current start pixels b0 and a0 are both white. Therefore, the position of a color-changed pixel b2 in the fourth byte B4 on the reference line (the third bit from the left of the fourth byte B4) is detected according to steps S75 and S80 of FIG. 8 (i.e., flowcharts shown in FIGS. 11 and 15), and pixels of the color (white) of the start pixel a0 are laid down up to the position of the pixel b2. Thereafter, the pixel on the decoding line that is just under the pixel b2 is set as the next start pixel a0. The color of the start pixel a0 is set to the color (white) of the pixel b2.

Now, the detecting procedure for the pixel b1 in step S62 of FIG. 6 will be described according to a flowchart (steps S71 to S79) shown in FIG. 7.

When detecting the pixel b1, it is first judged whether or not the start pixel a0 on the decoding line is white (step S71). When the start pixel a0 is white (route "YES" in step S71), it is judged whether or not the start pixel b0 on the reference line is black (step S72).

Figure 9:
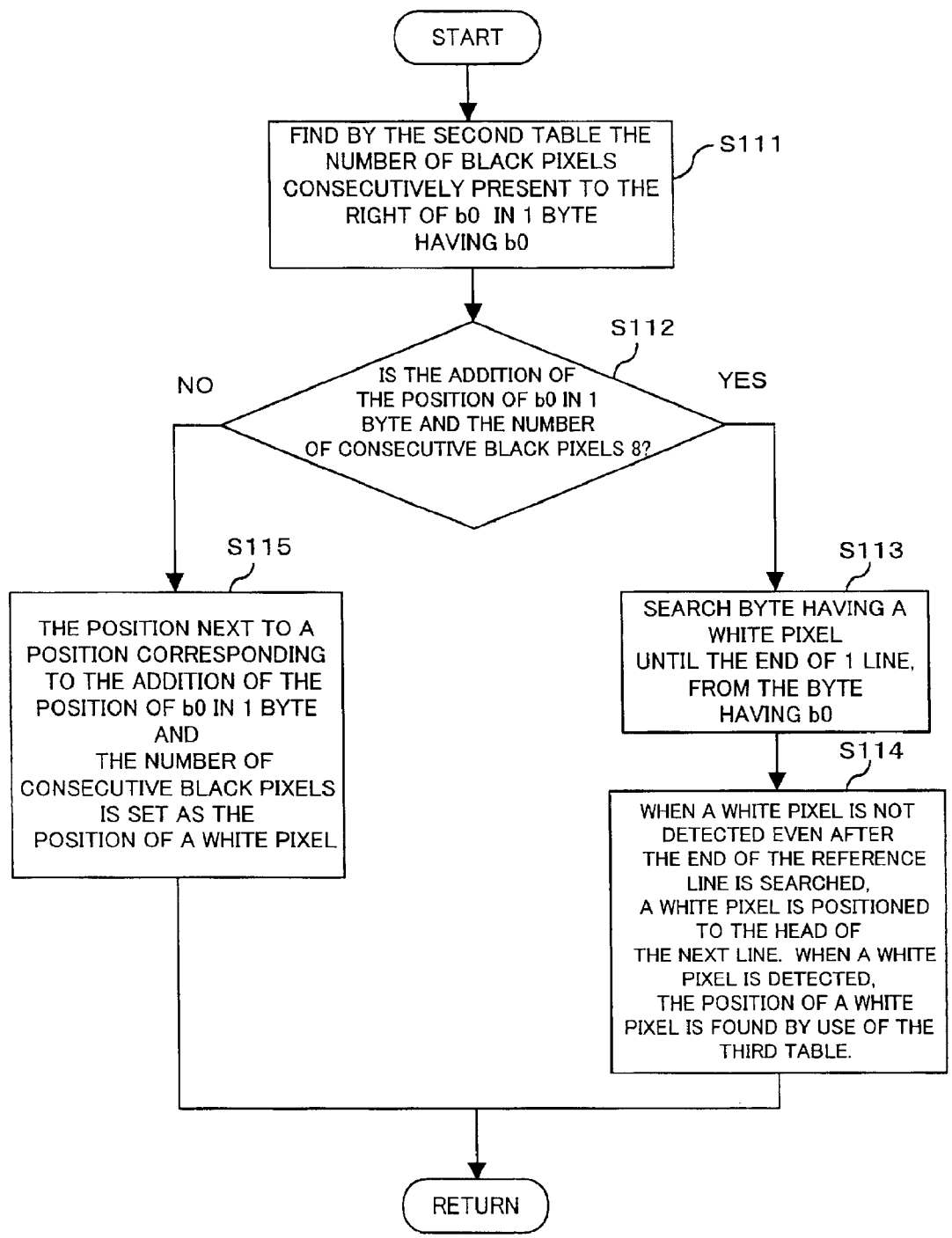
FIG. 9 is a flowchart used to explain a detailed procedure that is performed in step S73 of FIGS. 7 and 8.

When the start pixel b0 is black (route "YES" in step S72), the position of a white pixel that appears first to the right of the start pixel b0 is found according to the procedure to be described later with reference to FIG. 9 (step S73). Based on the position of the white pixel found in step S73, the position of the pixel (black pixel) b1 is found according to the procedure to be described later with reference to FIG. 10 (step S74). On the other hand, when the start pixel b0 is white (route "NO" in step S72), the position of the pixel (black pixel) b1 is found according to the procedure to be described later with reference to FIG. 11 (step S75).

When the start pixel a0 is black (route "NO" in step S71), it is judged whether or not the start pixel b0 on the reference line is white (step S76).

Figure 12:
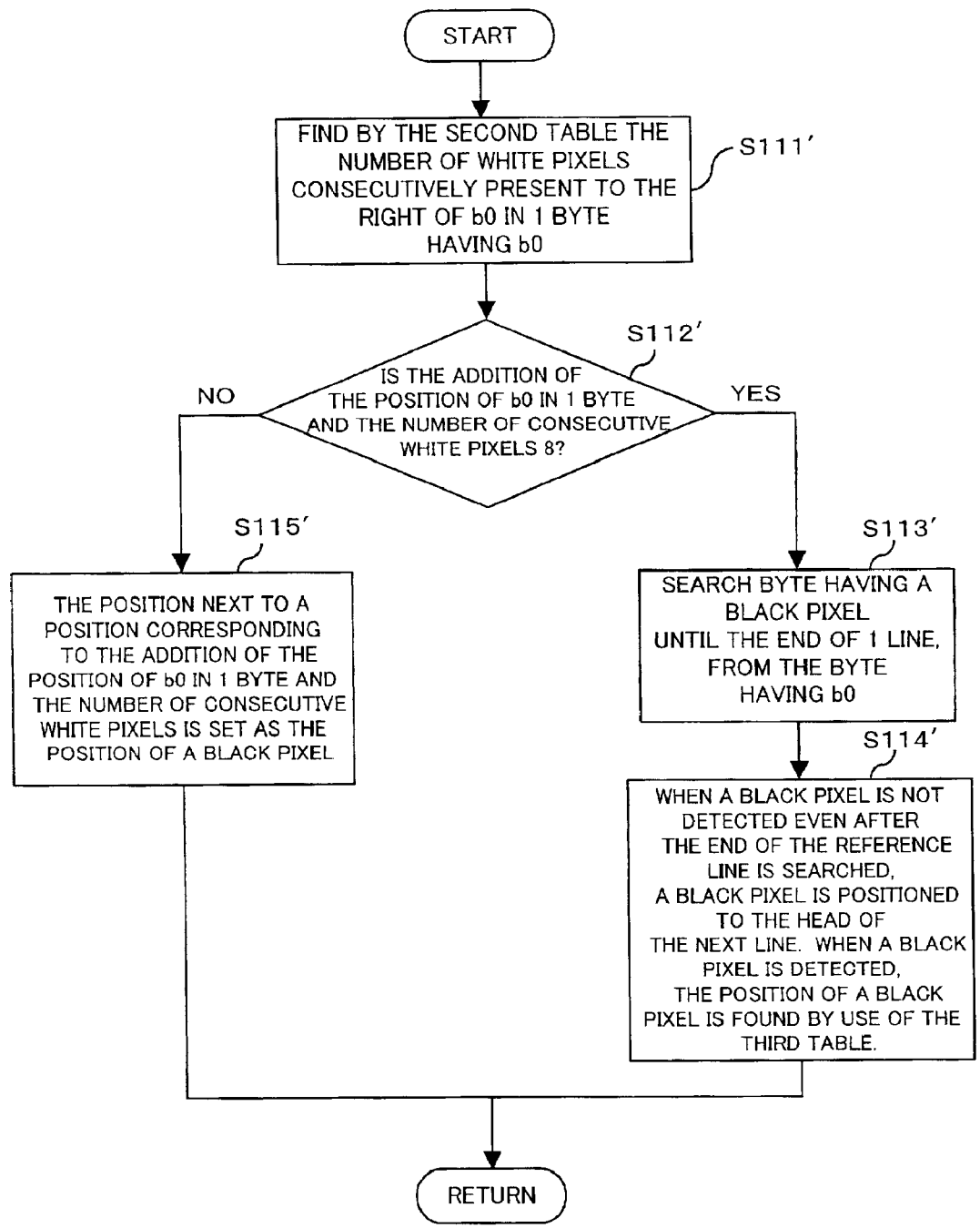
FIG. 12 is a flowchart used to explain a detailed procedure that is performed in step S77 of FIGS. 7 and 8.

When the start pixel b0 is white (route "YES" in step S76), the position of a black pixel that appears first to the right of the start pixel b0 is found according to the procedure to be described later with reference to FIG. 12 (step S77). Based on the position of the black pixel found in step S77, the position of the pixel (white pixel) b1 is found according to the procedure to be described later with reference to FIG. 13 (step S78). On the other hand, when the start pixel b0 is black (route "NO" in step S76), the position of the pixel (white pixel) b1 is found according to the procedure to be described later with reference to FIG. 14 (step S79).

Next, the detecting procedure for the pixel b2 in step S55 of FIG. 6 will be described according to a flowchart (steps S71 to S81) shown in FIG. 8. After the pixel b1 has been detected according to the procedure shown in FIG. 7, the pixel b2 is detected by employing the detected pixel b1. Therefore, the flowchart of FIG. 8, in addition to the aforementioned steps of FIG. 7, includes only steps S80 and S81.

That is, when the color-changed pixel (black pixel) b1 is detected according to step S74 or S75, the color-changed pixel (white pixel) b2 is found according to the procedure to be described later with reference to FIG. 15 (step S80). On the other hand, when the color-changed pixel (white pixel) b1 is detected according to step S78 or S79, the color-changed pixel (black pixel) b2 is found according to the procedure to be described later with reference to FIG. 16 (step S81).

Figure 7:
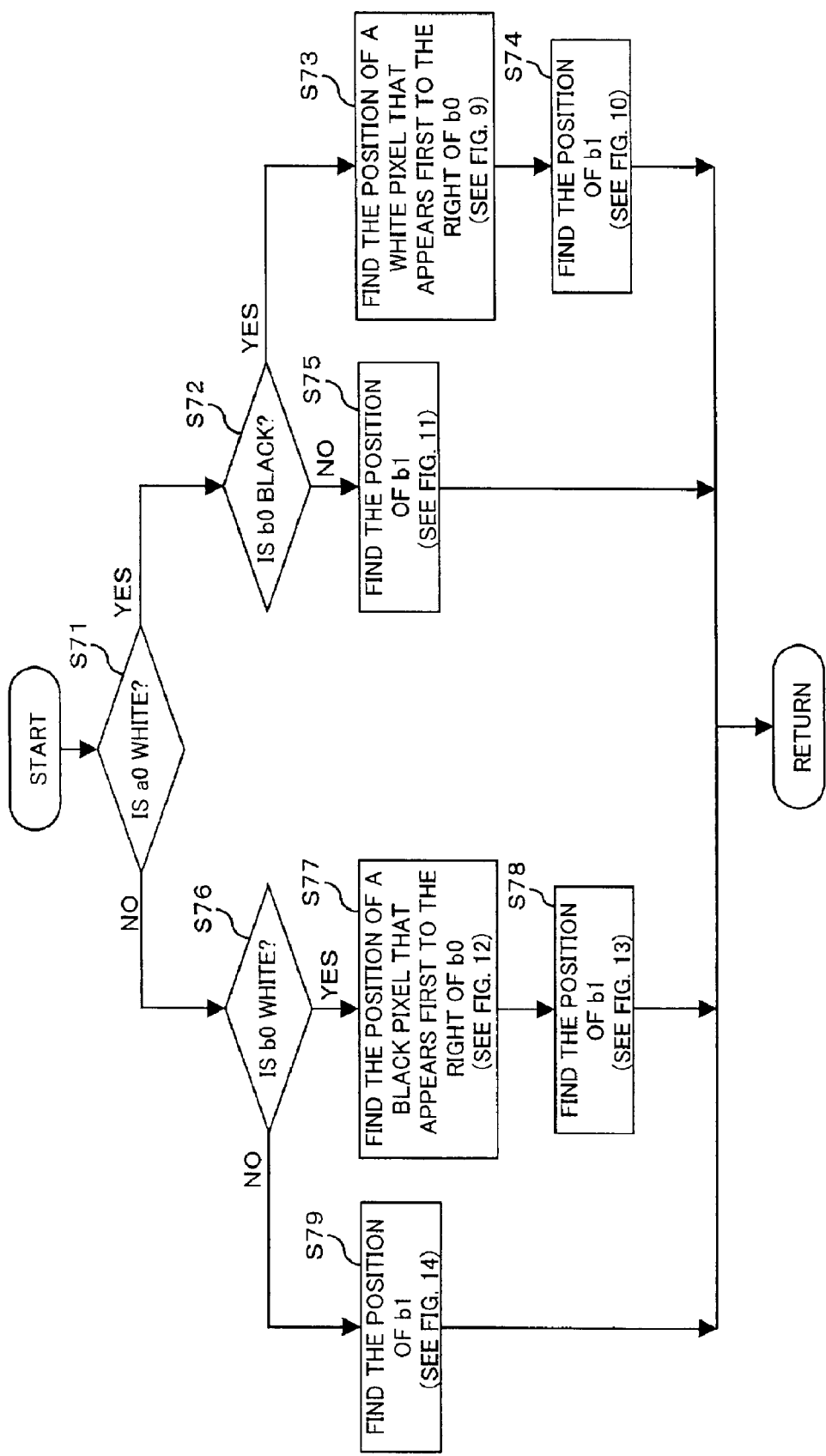
FIG. 7 is a flowchart used to explain a detecting procedure for a color-changed pixel b1 that is performed in step S62 of FIG. 6.
Figure 8:
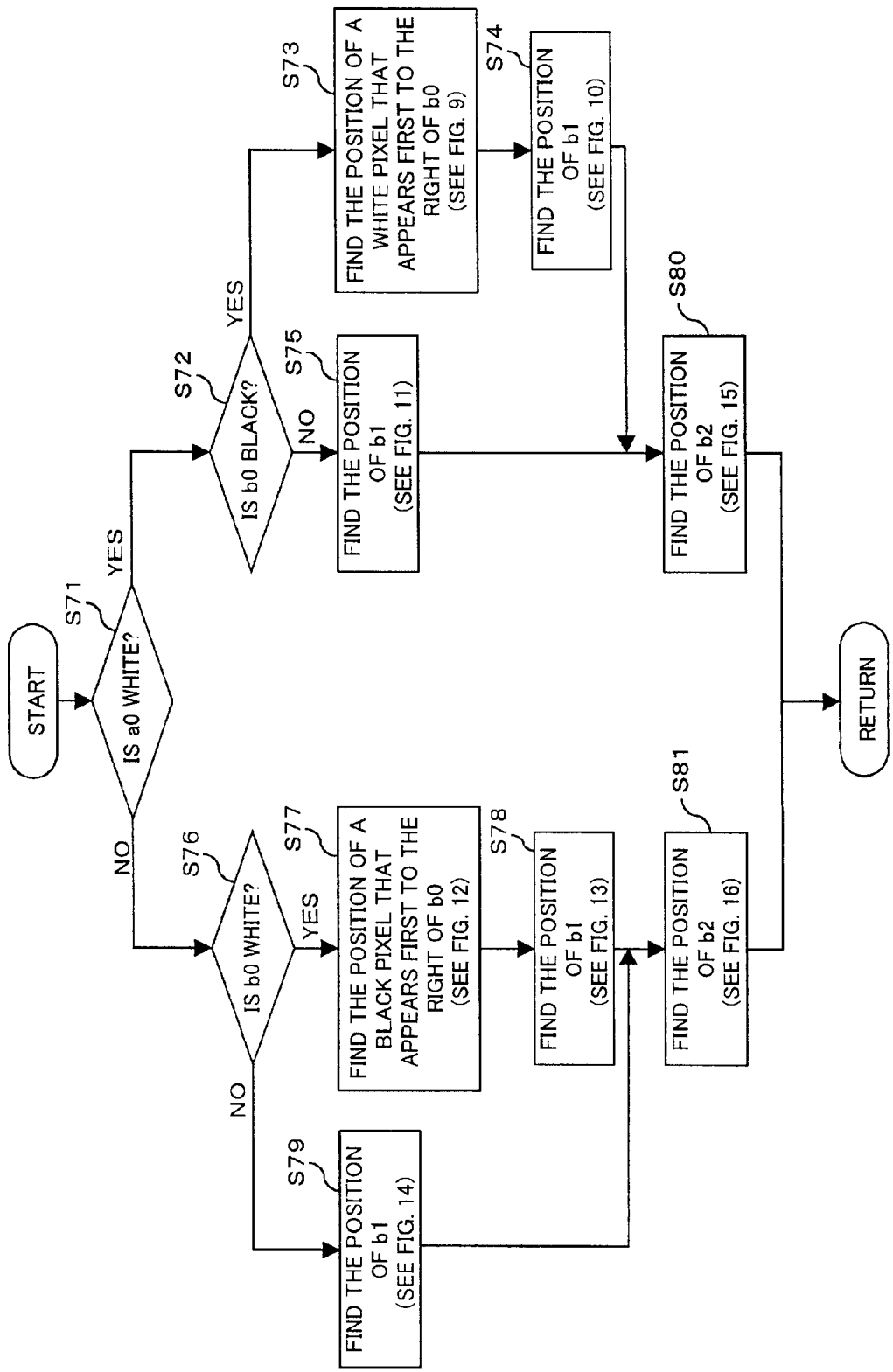
FIG. 8 is a flowchart used to explain a detecting procedure for a color-changed pixel b2 that is performed in step S55 of FIG. 6.

Note that the judgement of color in steps S71, S72, and S76 of FIGS. 7 and 8 is made by using the fifth table CLR[8][256].

A detailed procedure in step S73 of FIGS. 7 and 8 will be described according to the flowchart (steps S111 to S115) shown in FIG. 9. First, for 1 byte in which the start pixel b0 is present, the number of black pixels (1s) consecutively present to the right of b0 is found by use of the second table B[8][256] (step S111). Next, it is judged whether or not the addition of the position of b0 in the 1 byte and the number of consecutive black pixels obtained in step S111 is 8 (step S112). When it is 8 (route "YES" in step S112), a search for a white pixel that is present to the right of the byte having the start pixel b0 is made by taking 1 byte of data (8 data bits) from the reference line at a time until the end of 1 line (step S113). When a white pixel is not detected even after the search reaches the end of the reference line, a white pixel is positioned to the head of the next line. On the other hand, when a white pixel is detected, the position of a white pixel that appears first when viewed from the head of the 1 byte (i.e., the position of a white pixel that appears first to the right of the pixel b0) is found by use of the third table LW[256] (step S114). When, in step S112, it is judged that it is not 8 (route"NO"), the position next to a position corresponding to the addition of the position of b0 in 1 byte and the number of consecutive black pixels obtained in step S111 is set as the position of a white pixel that appears first to the right of the start pixel b0 (step S115).

Figure 10:
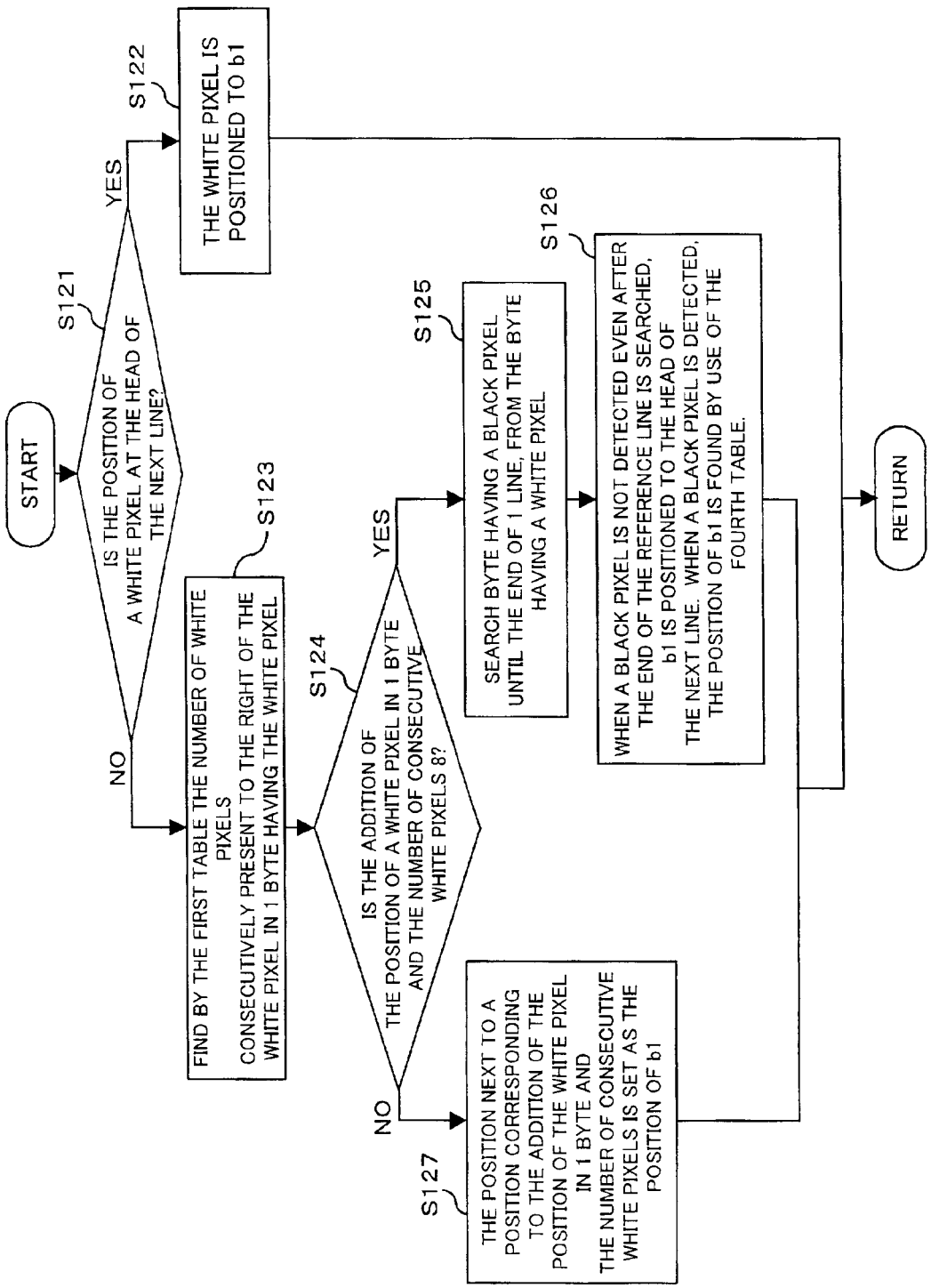
FIG. 10 is a flowchart used to explain a detailed procedure that is performed in step S74 of FIGS. 7 and 8.

A detailed procedure in step S74 of FIGS. 7 and 8 will be described according to the flowchart (steps S121 to S127)

shown in FIG. 10. First, it is judged whether or not the position of the white pixel obtained according to step S73 (i.e., the flowchart shown in FIG. 9) is at the head of the next line (step S121). When it is at the head (route "YES" in step S121), the position of the white pixel obtained in step S73 is set as the position of the pixel b1 (step S122). On the other hand, when it is not at the head (route "NO" in step S121), the number of white pixels (0s) consecutively present to the right of the aforementioned white pixel is found for 1 byte in which the white pixel is present, by use of the first table W[8][256] (step S123). Next, it is judged whether or not the addition of the position of the white pixel in the 1 byte and the number of consecutive white pixels obtained in step S123 is 8 (step S124). When it is 8 (route "YES" in step S124), a search for a black pixel that is present to the right of the byte having the white pixel is made by taking 1 byte of data (8 data bits) from the reference line at a time until the end of 1 line (step S125). When a black pixel is not detected even after the search reaches the end of the reference line, the pixel b1 is positioned to the head of the next line. On the other hand, when a black pixel is detected, the position of a black pixel that appears first when viewed from the head of the 1 byte is found as the position of the pixel b1 by use of the fourth table LB [256] (step S126). When, in step S124, it is judged that it is not 8 (route "NO"), the position next to a position corresponding to the addition of the position of the aforementioned white pixel in 1 byte and the number of consecutive white pixels obtained in step S123 is set as the position of the pixel b1 (step S127).

Figure 11:
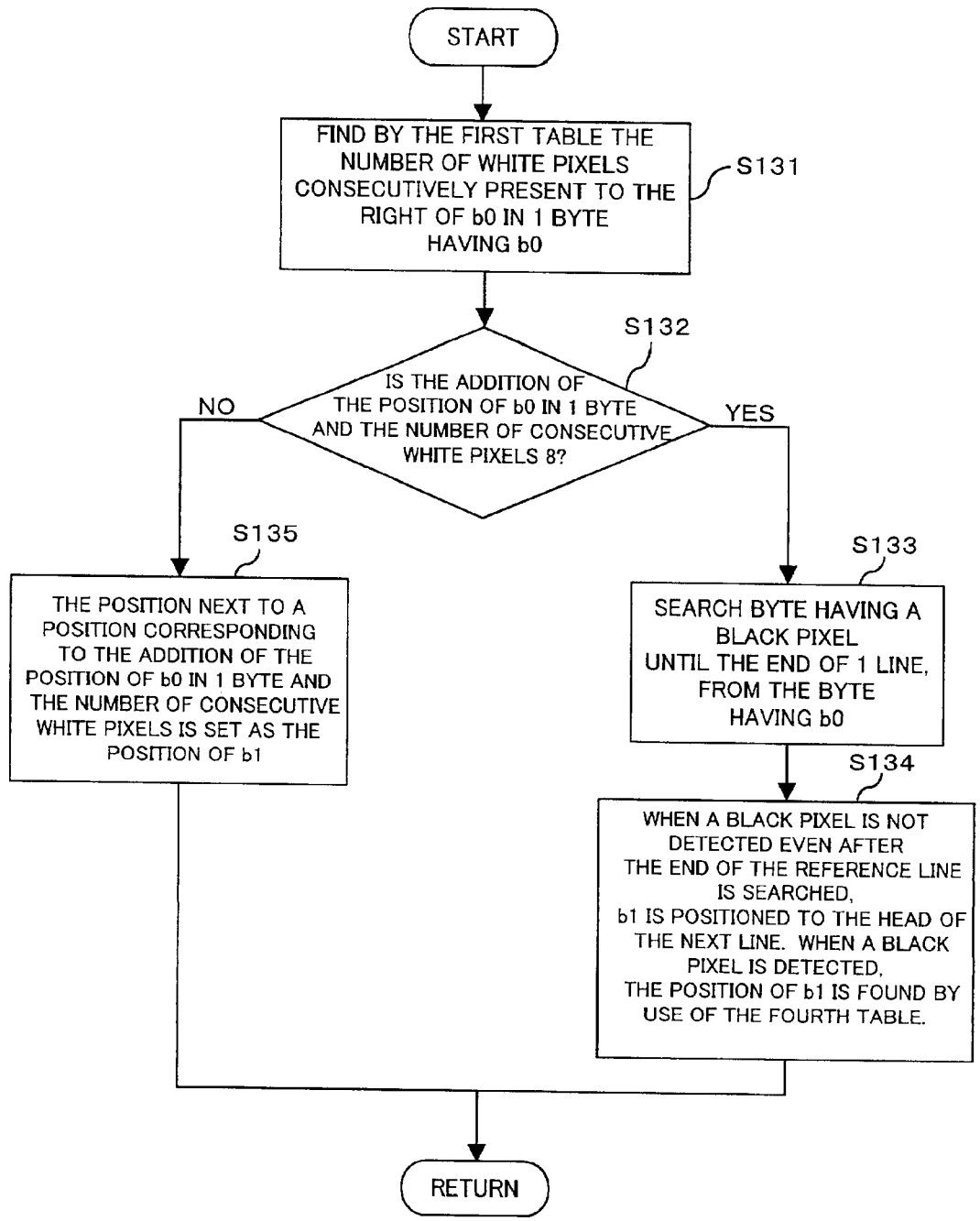
FIG. 11 is a flowchart used to explain a detailed procedure that is performed in step S75 of FIGS. 7 and 8.

A detailed procedure in step S75 of FIGS. 7 and 8 will be described according to the flowchart (steps S131 to S135) shown in FIG. 11. First, for 1 byte in which the start pixel b0 is present, the number of white pixels (0s) consecutively present to the right of b0 is found by use of the first table W[8][256] (step S131). Next, it is judged whether or not the addition of the position of b0 in the 1 byte and the number of consecutive white pixels obtained in step S131 is 8 (step S132). When it is 8 (route "YES" in step S132), a search for a black pixel that is present to the right of the byte having the start pixel b0 is made by taking 1 byte of data (8 data bits) from the reference line at a time until the end of 1 line (step S133). When a black pixel is not detected even after the search reaches the end of the reference line, the pixel b1 is positioned to the head of the next line. On the other hand, when a black pixel is detected, the position of a black pixel that appears first when viewed from the head of the 1 byte is found as the position of the pixel b1 by use of the fourth table LB[256] (step S134). When, in step S132, it is judged that it is not 8 (route "NO"), the position next to a position corresponding to the addition of the position of b0 in 1 byte and the number of consecutive white pixels obtained in step S131 is set as the position of the pixel b1 (step S135).

A detailed procedure in step S77 of FIGS. 7 and 8 will be described according to the flowchart (steps S111' to S115') shown in FIG. 12. First, for 1 byte in which the start pixel b0 is present, the number of white pixels (0s) consecutively present to the right of b0 is found by use of the first table W[8][256] (step S111'). Next, it is judged whether or not the addition of the position of b0 in the 1 byte and the number of consecutive white pixels obtained in step S111' is 8 (step S112'). When it is 8 (route "YES" in step S112'), a search for a white pixel that is present to the right of the byte having the start pixel b0 is made by taking 1 byte of data (8 data bits) from the reference line at a time until the end of 1 line (step S113'). When a black pixel is not detected even after the search reaches the end of the reference line, a black pixel is positioned to the head of the next line. On the other hand, when a black pixel is detected, the position of a black pixel that appears first when viewed from the head of the 1 byte (i.e., the position of a black pixel that appears first to the right of the pixel b0) is found by use of the fourth table LB[256] (step S114'). When, in step S112', it is judged that it is not 8 (route "NO"), the position next to a position corresponding to the addition of the position of b0 in 1 byte and the number of consecutive white pixels obtained in step S111' is set as the position of a black pixel that appears first to the right of the start pixel b0 (step S115').

Figure 13:
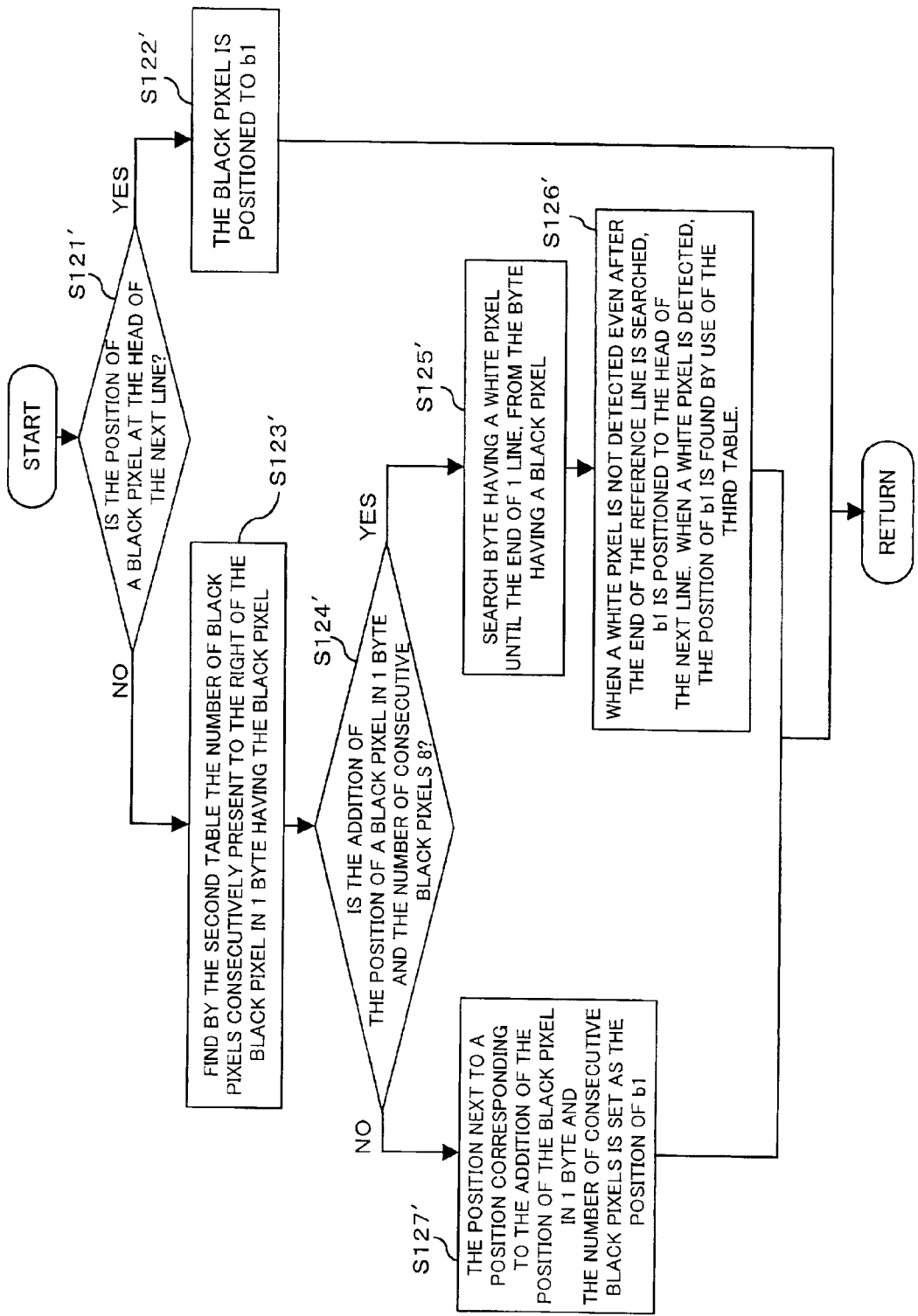
FIG. 13 is a flowchart used to explain a detailed procedure that is performed in step S78 of FIGS. 7 and 8.

A detailed procedure in step S78 of FIGS. 7 and 8 will be described according to the flowchart (steps S121' to S127') shown in FIG. 13. First, it is judged whether or not the position of the black pixel obtained according to step S77 (i.e., the flowchart shown in FIG. 12) is at the head of the next line (step S121'). When it is at the head (route "YES" in step S121'), the position of the black pixel obtained in step S77 is set as the position of the pixel b1 (step S122'). On the other hand, when it is not at the head (route "NO" in step S121'), the number of black pixels (1s) consecutively present to the right of the aforementioned black pixel is found for 1 byte in which the black pixel is present, by use of the second table B[8][256] (step S123'). Next, it is judged whether or not the addition of the position of the black pixel in the 1 byte and the number of consecutive black pixels obtained in step S123' is 8 (step S124'). When it is 8 (route "YES" in step S124'), a search for a white pixel that is present to the right of the byte having the aforementioned black pixel is made by taking 1 byte of data (8 data bits) from the reference line at a time until the end of 1 line (step S125'). When a white pixel is not detected even after the search reaches the end of the reference line, the pixel b1 is positioned to the head of the next line. On the other hand, when a white pixel is detected, the position of a white pixel that appears first when viewed from the head of the 1 byte is found as the position of the pixel b1 by use of the third table LW[256] (step S126'). When, in step S124', it is judged that it is not 8 (route "NO"), the position next to a position corresponding to the addition of the position of the aforementioned black pixel in 1 byte and the number of consecutive black pixels obtained in step S123' is set as the position of the pixel b1 (step S127').

Figure 14:
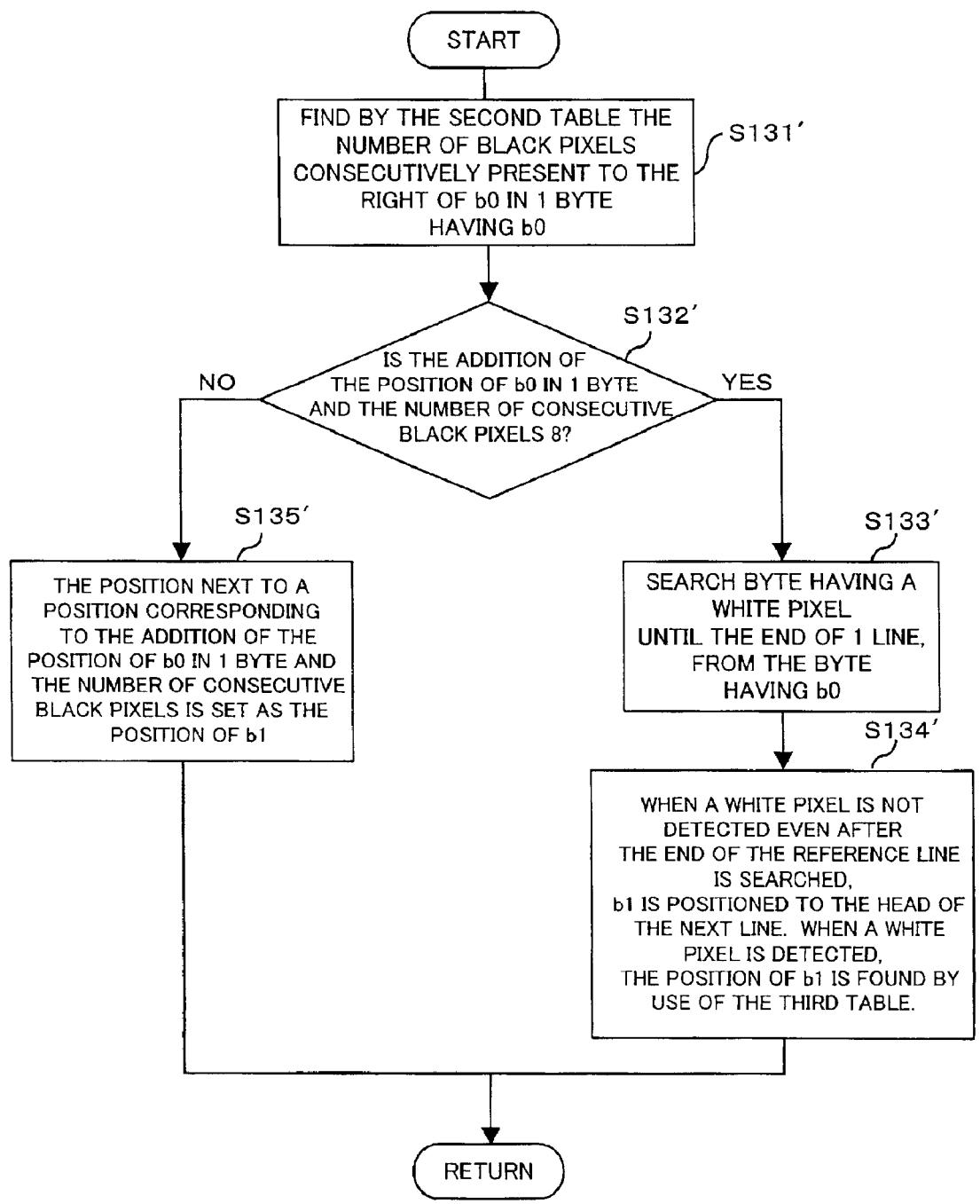
FIG. 14 is a flowchart used to explain a detailed procedure that is performed in step S79 of FIGS. 7 and 8.

A detailed procedure in step S79 of FIGS. 7 and 8 will be described according to the flowchart (steps S131' to S135') shown in FIG. 14. First, for 1 byte in which the start pixel b0 is present, the number of black pixels (1s) consecutively present to the right of b0 is found by use of the second table B[8][256] (step S131'). Next, it is judged whether or not the addition of the position of b0 in the 1 byte and the number of consecutive black pixels obtained in step S131' is 8 (step S132'). When it is 8 (route "YES" in step S132'), a search for a white pixel that is present to the right of the byte having the start pixel b0 is made by taking 1 byte of data (8 data bits) from the reference line at a time until the end of 1 line (step S133'). When a white pixel is not detected even after the search reaches the end of the reference line, the pixel b1 is positioned to the head of the next line. On the other hand, when a white pixel is detected, the position of a white pixel that appears first when viewed from the head of the 1 byte is found as the position of the pixel b1 by use of the third table LW[256] (step S134'). When, in step S132', it is judged that it is not 8 (route "NO"), the position next to a position corresponding to the addition of the position of b0 in 1 byte and the number of consecutive black pixels obtained in step S123' is set as the position of the pixel b1 (step S135').

Figure 15:
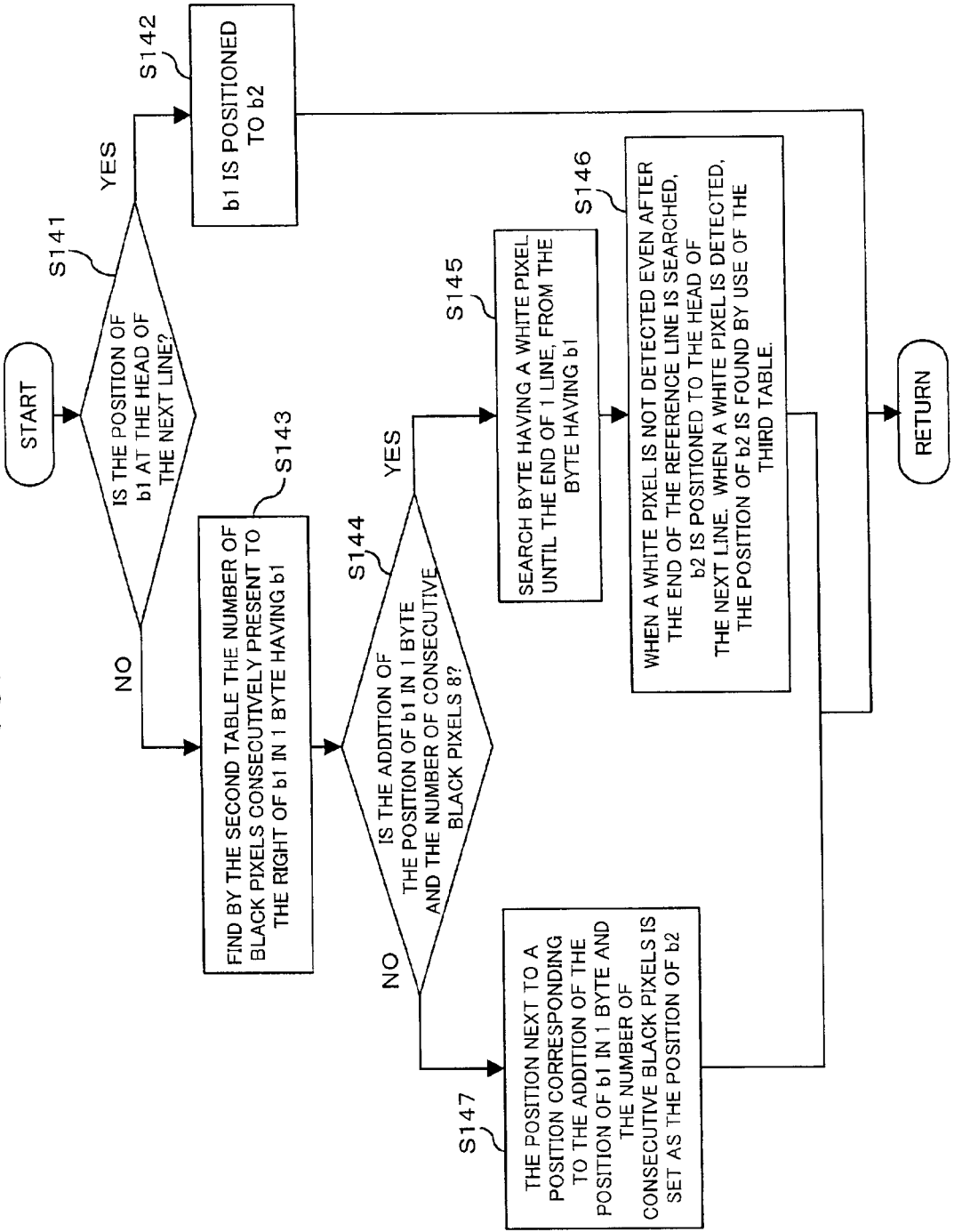
FIG. 15 is a flowchart used to explain a detailed procedure that is performed in step S80 of FIG. 8.

A detailed procedure in step S80 of FIG. 8 will be described according to the flowchart (steps S141 to S147)

shown in FIG. 15. First, it is judged whether or not the position of the pixel b1 obtained according to step S74 or S75 (i.e., the flowchart shown in FIGS. 10 or 11) is at the head of the next line (step S141). When it is at the head (route "YES" in step S141), the position of the pixel b1 obtained in step S74 or S75 is set as the position of the pixel b2 (step S142). On the other hand, when it is not at the head (route "NO" in step S141), the number of black pixels (1s) consecutively present to the right of the pixel b1 is found for 1 byte in which the pixel b1 is present, by use of the second table B[8][256] (step S143). Next, it is judged whether or not the addition of the position of b1 in the 1 byte and the number of consecutive black pixels obtained in step S143 is 8 (step S144). When it is 8 (route "YES" in step S144), a search for a white pixel that is present to the right of the byte having the pixel b1 is made by taking 1 byte of data (8 data bits) from the reference line at a time until the end of 1 line (step S145). When a white pixel is not detected even after the search reaches the end of the reference line, the pixel b2 is positioned to the head of the next line. On the other hand, when a white pixel is detected, the position of a white pixel that appears first when viewed from the head of the 1 byte is found as the position of the pixel b2 by use of the third table LW[256] (step S146) When, in step S144, it is judged that it is not 8 (route "NO"), the position next to a position corresponding to the addition of the position of b1 in 1 byte and the number of consecutive black pixels obtained in step S143 is set as the position of the pixel b2 (step S147).

Figure 16:
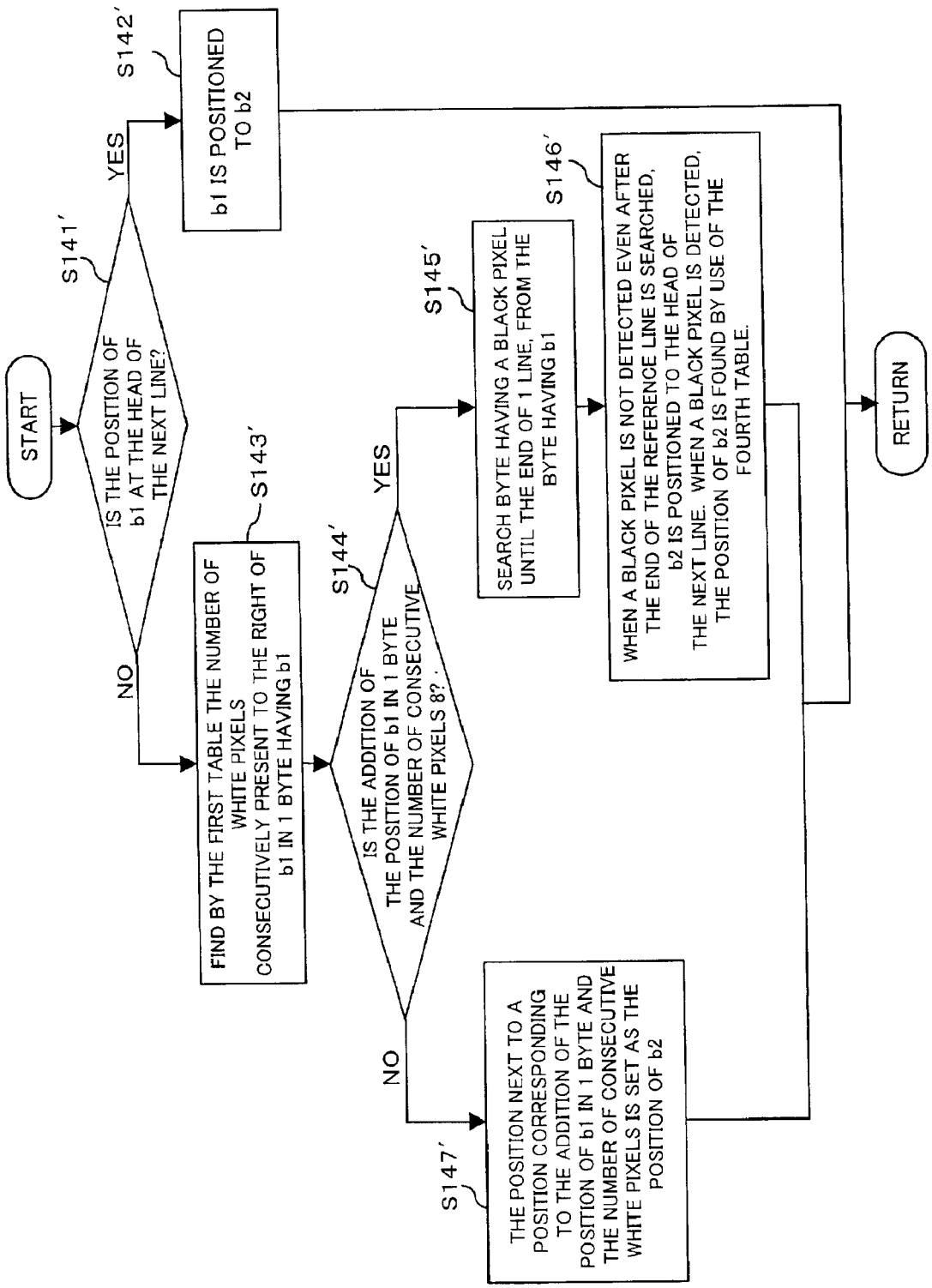
FIG. 16 is a flowchart used to explain a detailed procedure that is performed in step S81 of FIG. 8.

A detailed procedure in step S81 of FIG. 8 will be described according to the flowchart (steps S141' to S147') shown in FIG. 16. First, it is judged whether or not the position of the pixel b1 obtained according to step S78 or S79 (i.e., the flowchart shown in FIGS. 13 or 14) is at the head of the next line (step S141'). When it is at the head (route "YES" in step S141'), the position of the pixel b1 obtained in step S78 or S79 is set as the position of the pixel b2 (step S142'). On the other hand, when it is not at the head (route "NO" in step S141'), the number of white pixels (0s) consecutively present to the right of the pixel b1 is found for 1 byte in which the pixel b1 is present, by use of the first table W[8][256] (step S143'). Next, it is judged whether or not the addition of the position of b1 in the 1 byte and the number of consecutive white pixels obtained in step S143' is 8 (step S144'). When it is 8 (route "YES" in step S144'), a search for a black pixel that is present to the right of the byte having the pixel b1 is made by taking 1 byte of data (8 data bits) from the reference line at a time until the end of 1 line (step S145'). When a black pixel is not detected even after the search reaches the end of the reference line, the pixel b2 is positioned to the head of the next line. On the other hand, when a black pixel is detected, the position of a black pixel that appears first when viewed from the head of the 1 byte is found as the position of the pixel b2 by use of the fourth table LB[256] (step S146'). When, in step S144', it is judged that it is not 8 (route "NO"), the position next to a position corresponding to the addition of the position of b1 in 1 byte and the number of consecutive white pixels obtained in step S143' is set as the position of the pixel b2 (step S147').

The detecting procedure for the pixel a2 in step S60 of FIG. 6 will be described according to the flowchart (steps S91 to S95) shown in FIG. 17.

When detecting the pixel a1, it is first judged whether or not the start pixel a0 on the decoding line is white (step S91). When the pixel a0 is white (route "YES" in step S91), the position of a black pixel a1 is found according to the procedure to be described later with reference to FIG. 18 (step S92). Then, the position of a white pixel a2 is found according to the procedure to be described later with reference to FIG. 19 (step S93). On the other hand, when the pixel a0 is black (route "NO" in step S91), the position of a white pixel a1 is found according to the procedure to be described later with reference to FIG. 20 (step S94). Then, the position of a black pixel a2 is found according to the procedure to be described later with reference to FIG. 21 (step S95).

Figure 17:
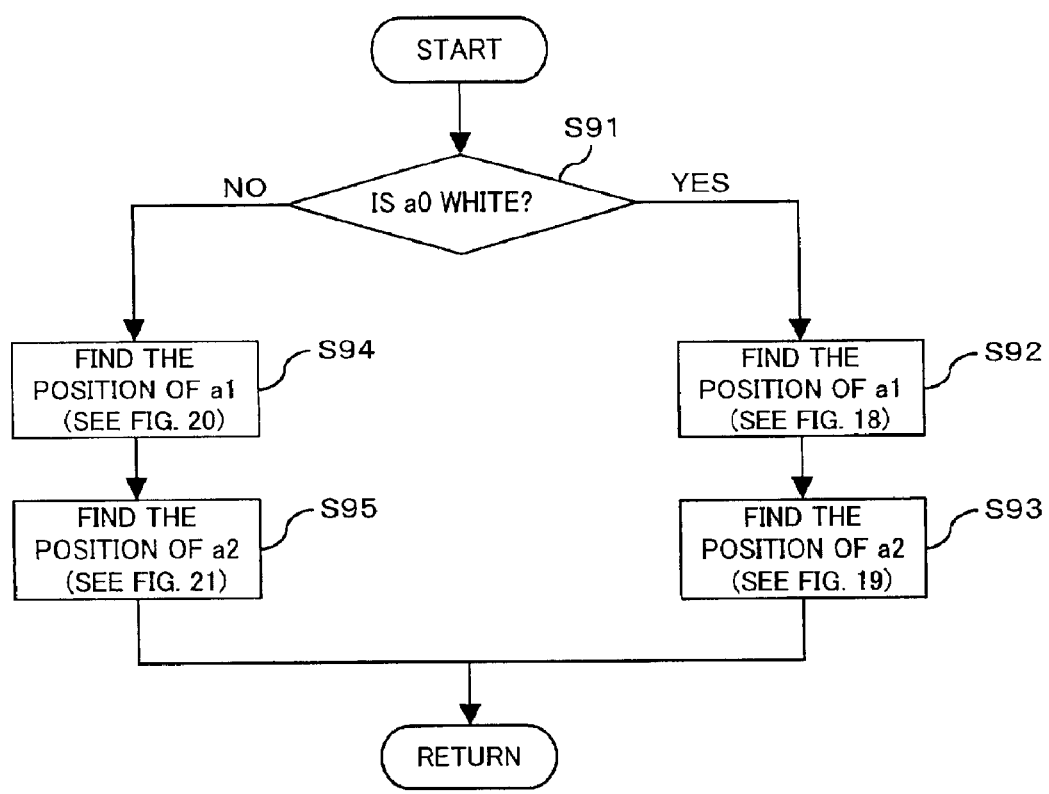
FIG. 17 is a flowchart used to explain a detecting procedure for a color-changed pixel a2 that is performed in step S60 of FIG. 6.

Note that the judgement of color in step S91 of FIG. 17 is made by using the fifth table CLR[8][256].

Figure 18:
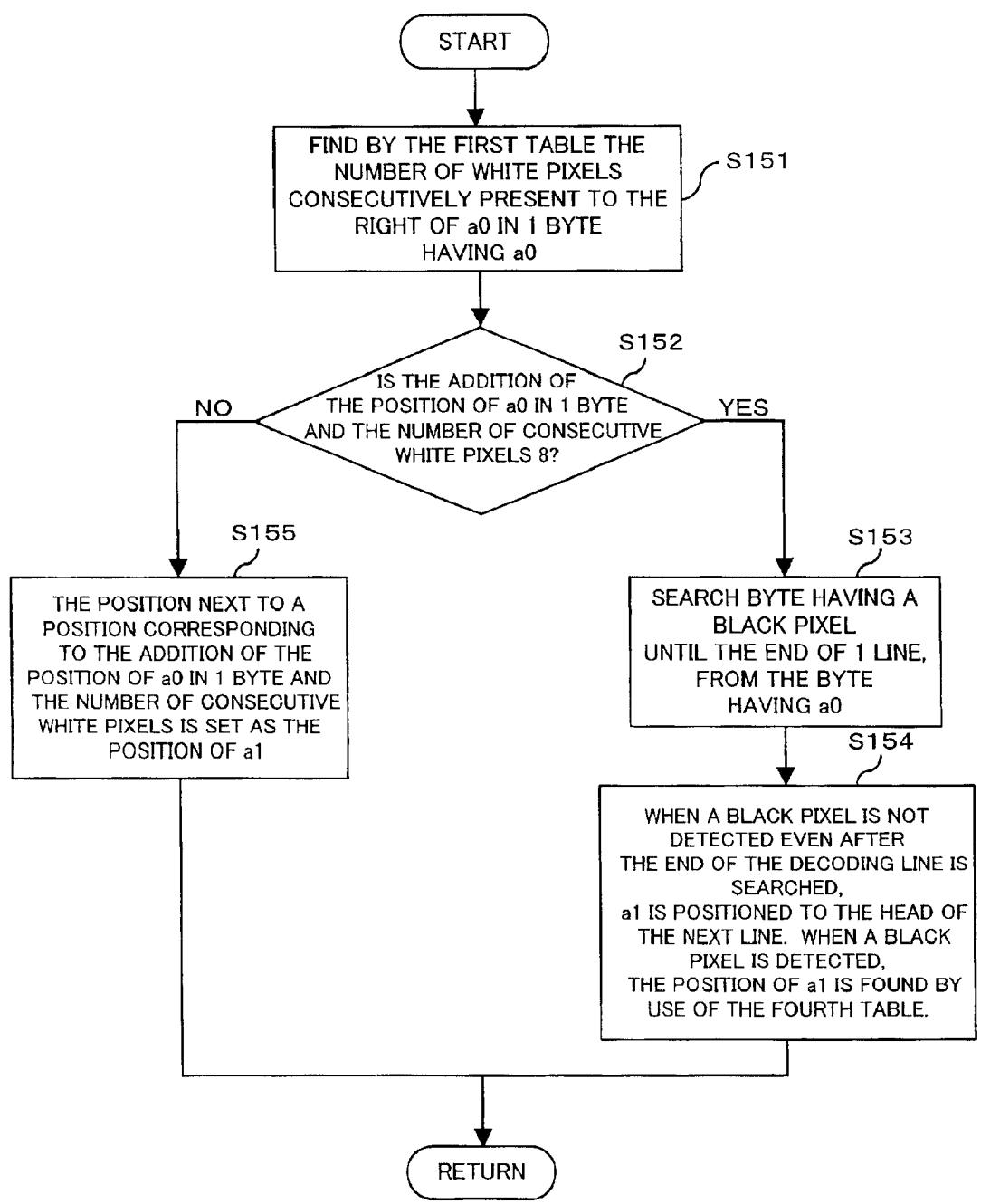
FIG. 18 is a flowchart used to explain a detailed procedure that is performed in step S92 of FIG. 17.

A detailed procedure in step S92 of FIG. 17 will be described according to the flowchart (steps S151 to S155) shown in FIG. 18. First, for 1 byte in which the start pixel a0 is present, the number of white pixels (0s) consecutively present to the right of a0 is found by use of the first table W[8][256] (step S151). Next, it is judged whether or not the addition of the position of a0 in the 1 byte and the number of consecutive white pixels obtained in step S151 is 8 (step S152). When it is 8 (route "YES" in step S152), a search for a black pixel that is present to the right of the byte having the start pixel a0 is made by taking 1 byte of data (8 data bits) from the decoding line at a time until the end of 1 line (step S153). When a black pixel is not detected even after the search reaches the end of the decoding line, the pixel a1 is positioned to the head of the next line. On the other hand, when a black pixel is detected, the position of a black pixel that appears first when viewed from the head of the 1 byte is found as the position of the pixel a1 by use of the fourth table LB[256] (step S154). When, in step S152, it is judged that it is not 8 (route "NO"), the position next to a position corresponding to the addition of the position of a0 in 1 byte and the number of consecutive white pixels obtained in step S153 is set as the position of the pixel a1 (step S155).

Figure 19:
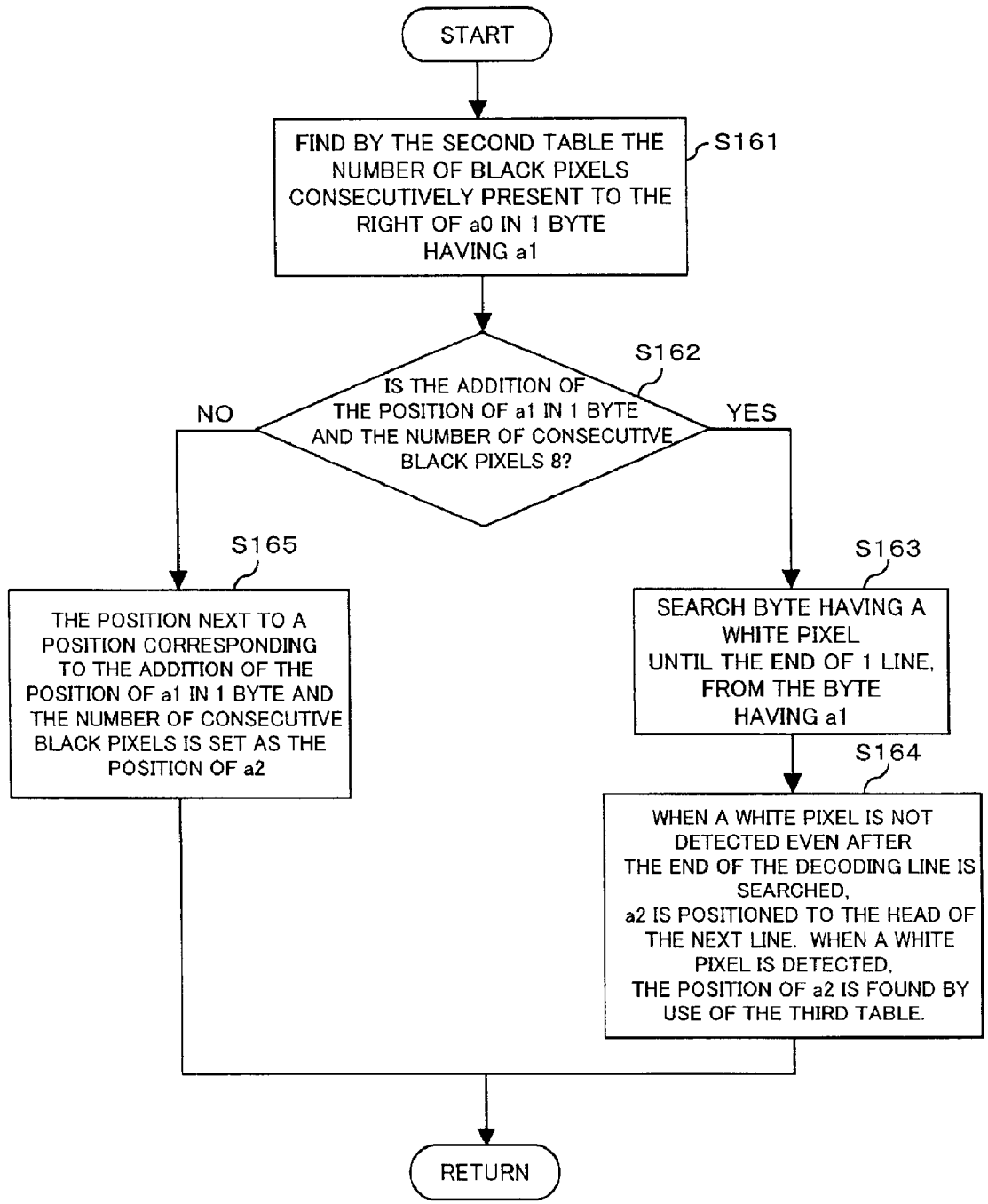
FIG. 19 is a flowchart used to explain a detailed procedure that is performed in step S93 of FIG. 17.

A detailed procedure in step S93 of FIG. 17 will be described according to the flowchart (steps S161 to S165) shown in FIG. 19. First, for 1 byte in which the pixel a1 obtained in step S92 (i.e., the flowchart shown in FIG. 18) is present, the number of black pixels (1s) consecutively present to the right of a1 is found by use of the second table B[8][256] (step S161). Next, it is judged whether or not the addition of the position of a1 in the 1 byte and the number of consecutive black pixels obtained in step S161 is 8 (step S162). When it is 8 (route "YES" in step S162), a search for a white pixel that is present to the right of the byte having the pixel a1 is made by taking out 1 byte of data (8 data bits) from the decoding line at a time until the end of 1 line (step S163). When a white pixel is not detected even after the search reaches the end of the decoding line, the pixel a2 is positioned to the head of the next line. On the other hand, when a white pixel is detected, the position of a white pixel that appears first when viewed from the head of the 1 byte is found as the position of the pixel a2 by use of the third table LW[256] (step S164). When, in step S162, it is judged that it is not 8 (route "NO"), the position next to a position corresponding to the addition of the position of a1 in 1 byte and the number of consecutive black pixels obtained in step S163 is set as the position of the pixel a2 (step S165).

Figure 20:
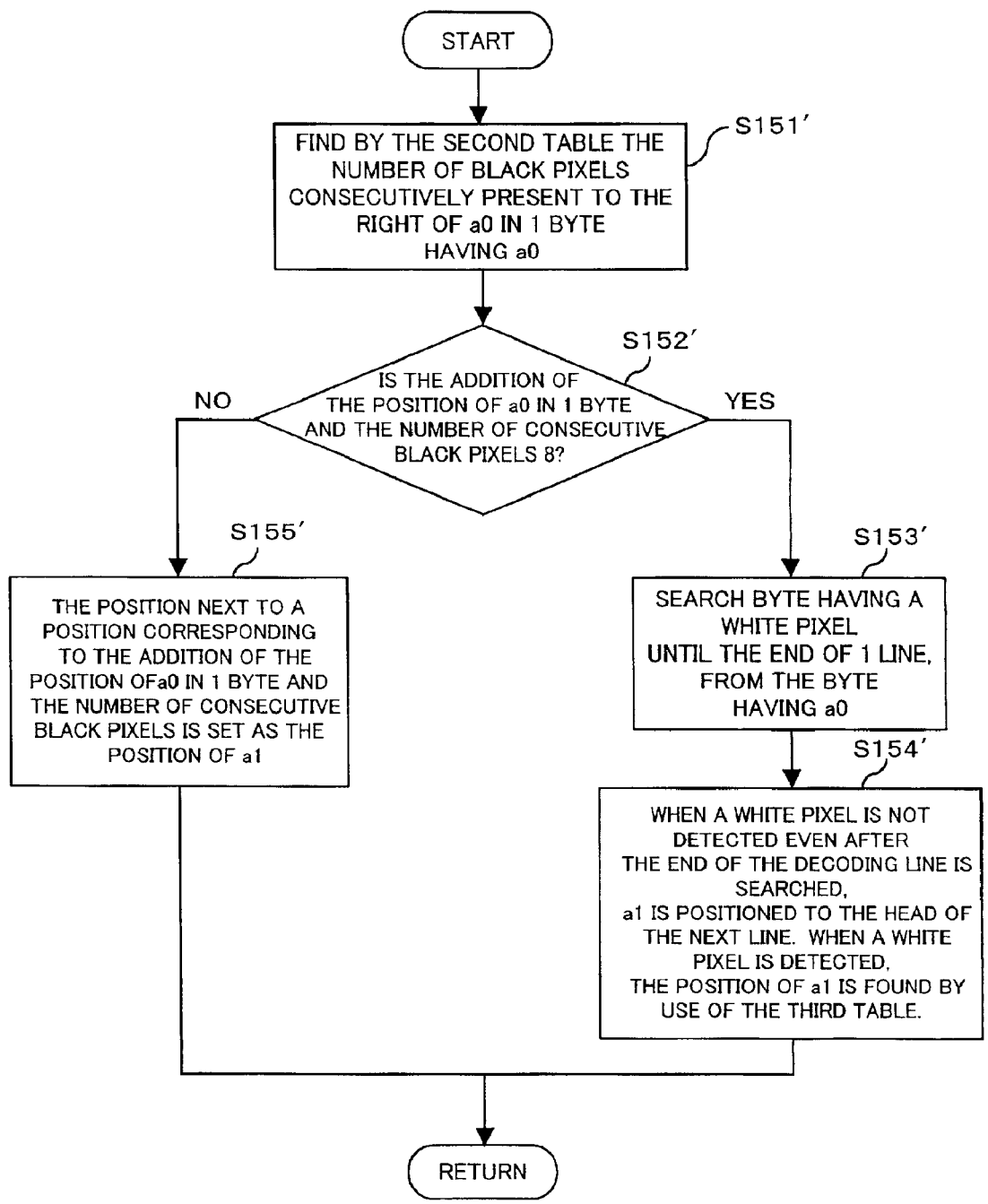
FIG. 20 is a flowchart used to explain a detailed procedure that is performed in step S94 of FIG. 17.

A detailed procedure in step S94 of FIG. 17 will be described according to the flowchart (steps S151' to S155') shown in FIG. 20. First, for 1 byte in which the start pixel a0 is present, the number of black pixels (1s) consecutively present to the right of a0 is found by use of the second table B[8][256] (step S151'). Next, it is judged whether or not the addition of the position of a0 in the 1 byte and the number of consecutive black pixels obtained in step S151' is 8 (step S152'). When it is 8 (route "YES" in step S152'), a search for a white pixel that is present to the right of the byte having the start pixel a0 is made by taking 1 byte of data (8 data bits) from the decoding line at a time until the end of 1 line (step S153'). When a white pixel is not detected even after the search reaches the end of the decoding line, the pixel a1 is positioned to the head of the next line. On the other hand, when a white pixel is detected, the position of a white pixel that appears first when viewed from the head of the 1 byte is found as the position of the pixel a1 by use of the third table LW[256] (step S154'). When, in step S152', it is judged that it is not 8 (route "NO"), the position next to a position corresponding to the addition of the position of a0 in 1 byte and the number of consecutive black pixels obtained in step S153' is set as the position of the pixel a1 (step S155').

Figure 21:
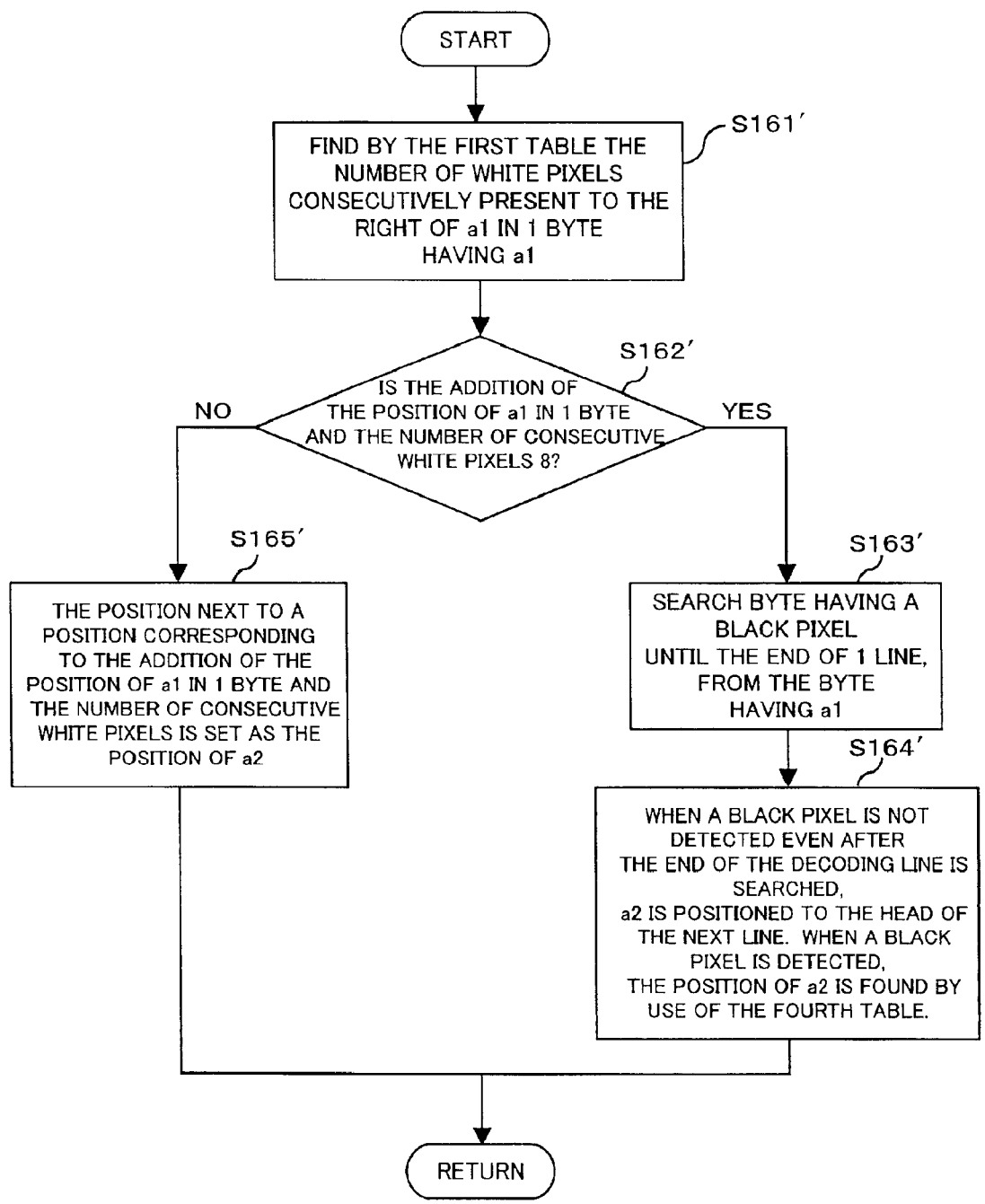
FIG. 21 is a flowchart used to explain a detailed procedure that is performed in step S95 of FIG. 17.

A detailed procedure in step S95 of FIG. 17 will be described according to the flowchart (steps S161' to S165') shown in FIG. 21. First, for 1 byte in which the pixel a1 obtained in step S94 (i.e., the flowchart shown in FIG. 20) is present, the number of white pixels (1s) consecutively present to the right of a1 is found by use of the first table W[8][256] (step S161'). Next, it is judged whether or not the addition of the position of a1 in the 1 byte and the number of consecutive white pixels obtained in step S161' is 8 (step S162'). When it is 8 (route "YES" in step S162'), a search for a black pixel that is present to the right of the byte having the pixel a1 is made by taking 1 byte of data (8 data bits) from the decoding line at a time until the end of 1 line (step S163'). When a black pixel is not detected even after the search reaches the end of the decoding line, the pixel a2 is positioned to the head of the next line. On the other hand, when a black pixel is detected, the position of a black pixel that appears first when viewed from the head of the 1 byte is found as the position of the pixel a2 by use of the fourth table LB[256] (step S164'). When, in step S162', it is judged that it is not 8 (route "NO"), the position next to a position corresponding to the addition of the position of a1 in 1 byte and the number of consecutive white pixels obtained in step S163' is set as the position of the pixel a2 (step S165').

Finally, an example of the recognizing and selecting procedure for a coding mode in step S54 of FIG. 6 that is performed by the decompressing section 25 will be described according to a flowchart (steps S201 to S229) shown in FIG. 26.

First, 1 byte (8 bits) of compressed data (coded data bits) is taken in (step S201), and the head bit of the coded data bits is set as an attentional bit (step S202). Then, it is judged by use of the fifth table CLR[8][256] whether the attentional bit is 0 or 1 (step S203).

When the attentional bit is 1 (route "NO" in step S203), the coding mode is recognized to be a vertical mode corresponding to symbolic code V(0) (step S204). It is judged whether or not the attentional bit is the end bit of the current 1 byte (step S205). When it is not the end bit (route "NO" in step S205), the bit next to the currently recognized code 1 is set as the next attentional bit (step S206), and the procedure returns to step S203.

On the other hand, when the current attentional bit is the end bit (route "YES" in step S205), it is judged whether or not all the compressed data bits have been taken in (step S229). When there are unprocessed compressed data bits (route "NO" in step S229), the procedure returns to step S201 and the next 1 byte of compressed data is taken in. On the other hand, when all the compressed data bits have been processed (route "YES" in step S229), the procedure ends.

When, in step S203, it is judged that the attentional bit is 0 (route "YES"), the number of white pixels (0s) consecutively present to the right of the attentional bit in 1 byte having the attentional bit is found by use of the first table W[8][256] (step S207). Next, it is judged whether or not the addition of the position of the attentional bit in the 1 byte and the number of consecutive white pixels obtained in step S207 is 8 (step S208). When it is not 8 (route "NO" in step S208), the addition of land the number of consecutive white pixels obtained in step S208 is found as the number of 0s consecutively present from the position of the attentional bit. Based on the number, the coding mode is recognized in the following manner (step S209).

When the number of consecutive 0s is 2 (route "2" in step S209), the coding mode is recognized to be a horizontal mode (step S210).

When the number of consecutive 0s is 3 (route "3" in step S209), the coding mode is recognized to be a pass mode (step S211).

When the number of consecutive 0s is 1 (route "1" in step S209), it is judged by use of the fifth table CLR[8][256] whether the two bits following 0 is 10 or 11 (step S212). When the two bits is 10 (route "YES" in step S212), the coding mode is recognized to be a vertical mode corresponding to symbolic code Vl(1) (step S213). When the two bits is 11 (route "NO" in step S212), the coding mode is recognized to be a vertical mode corresponding to symbolic code Vr(1) (step S214).

When the number of consecutive 0s is 4 (route "4" in step S209), it is judged by use of the fifth table CLR[8][256] whether the two bits following 0 is 10 or 11 (step S215). When the two bits is 10 (route "YES" in step S215), the coding mode is recognized to be a vertical mode corresponding to symbolic code Vl(2) (step S216). When the two bits is 11 (route "NO" in step S215), the coding mode is recognized to be a vertical mode corresponding to symbolic code Vr(2) (step S217).

When the number of consecutive 0s is 5 (route "5" in step S209), it is judged by use of the fifth table CLR[8][256] whether the two bits following 0 is 10 or 11 (step S218). When the two bits is 10 (route "YES" in step S218), the coding mode is recognized to be a vertical mode corresponding to symbolic code Vl(3) (step S219). When the two bits is 11 (route "NO" in step S218), the coding mode is recognized to be a vertical mode corresponding to symbolic code Vr(3) (step S220).

When, in step S208, it is judged to be 8 (route "YES"), the next 1 byte of compressed data (coded data bits) is taken in (step S221). The head bit of the coded data bits is set as an attentional bit (step S222). Next, it is judged by use of the fifth table CLR[8][256] whether the attentional bit is 0 or 1 (step S223).

When the attentional bit is 1 (route "NO" in step S223), the coding mode is recognized according to the addition of 1 and the number of consecutive white pixels obtained in step S207, in the same procedure as steps S210 to S220 (step S224).

On the other hand, when the attentional bit is 0 (route "YES" in step S223), the number of white pixels (0s) consecutively present to the right of the attentional bit in the 1 byte having the attentional bit is found by use of the first table W[8][256] (step S225).

Next, according to the addition of 2, the number of consecutive white pixels obtained in step S207, and the number of consecutive white pixels obtained in step S225, the coding mode is recognized in the same procedure as steps S210 to S220 (step S226).

Thus, in steps S210, S211, S213, S214, S216, S217, S219, S220, S224, and S266, the coding mode is recognized.

Thereafter, it is judged whether or not the end bit of the currently recognized code is the end bit of the currently taken 1 byte (step S227). When it is not the end bit (route "NO" in step S227), the bit next to the currently recognized code is set as the next attentional bit (step S228), and the procedure returns to step S203.

When it is the end bit (route "YES" in step S227), it is judged whether or not all the compressed data bits have been taken in (step S229). When there are unprocessed compressed data bits (route "NO" in step S229), the procedure returns to step S201 and the next 1 byte of compressed data is taken in. On the other hand, when all the compressed data bits have been processed (route "YES" in step S229), the procedure ends.

Thus, according to the preferred embodiment of the present invention, when decompressing binary data compressed by MMR coding, the pixels b1, b2, a1, and a2 on the reference line and the decoding line are detected in units of 1 byte (8 bits) by use of the first through the fifth tables. Therefore, the present invention is capable of efficiently detecting the pixels b1, b2, a1, and a2.

In addition, the process of recognizing the codes contained in compressed data (i.e., coding modes) is performed in units of 1 byte (8 bits) by employing the first through the fifth tables. Therefore, the present invention is capable of efficiently detecting the coding modes.

Thus, as compared with the conventional method of recognizing the positions of color-changed pixels and the coding modes, the preferred embodiment is capable of considerably speeding up the process of decompressing compressed binary data and considerably shortening the time required for the decompressing process. Particularly, the present invention is extremely effective when employed in the case where image data has high resolution and the space between color-changed pixels is long. Thus, the present invention is capable of considerably shortening the data decompressing time.

While the present invention has been described with reference to the preferred embodiment thereof, the invention is not to be limited to the details given herein, but may be modified within the scope of the invention hereinafter claimed.

For example, although the preferred embodiment has been described with reference to the case in which a reference line, compressed data, and a decoding line are divided into blocks of 1 byte (8 bits), the present invention is not to be limited to this case.

In addition, the preferred embodiment has been described with reference to the case where data compressed by MMR coding is decompressed. However, the present invention is not limited to MMR coding. The invention is also applicable to the case where data compressed by other coding methods (e.g., MH coding) is decompressed, and is capable of obtaining the same advantages as the preferred embodiment.

What is claimed is:

1. A method for decompressing compressed data obtained by coding binary data, which comprises a plurality of data bit lines acquired from an image, for each data bit line, based on both a position of a color-changed pixel on said data bit line and a position of a color-changed pixel on a reference line adjacent to said data bit line, said method comprising the steps of:

preparing a table which lists a plurality of bit patterns represented by a predetermined number of reference data bits, and lists a consecutive number of bits adjacent to a predetermined data bit of the reference data bits, that have the same color as the predetermined data bit;

serially taking said predetermined number of reference data bits at a time from a bit sequence forming said reference line;

searching said table with both said reference data bits and a position of the predetermined data bit in said reference data bits, and thereby detecting the consecutive number of bits adjacent to the predetermined data bit, that have the same color as the predetermined data bit;

finding a pixel, adjacent to the predetermined data bit by a distance equal to the addition of 1 and the detected number of bits, as a color-changed pixel on said reference line; and decoding said compressed data, based on a position of said found color-changed pixel on said reference line.

2. The method as set forth in claim 1, wherein said compressed data is data coded by modified-modified READ (MMR) coding;

said predetermined number of reference data bits are serially taken at a time from a bit sequence forming said compressed data;

said table is searched with both said reference data bits and a position of the predetermined data bit, whereby the number of 0s consecutively adjacent to the predetermined data bit is detected;

according to a code corresponding to the detected number of 0s, a coding mode is recognized; and according to the recognized coding mode, said compressed data is decoded.

3. The method as set forth in claim 2, wherein a bit position in said reference data bits, which corresponds to a position of a start color-changed pixel present on a decoding line obtained by decoding said compressed data, is employed as a position of an attentional bit.

4. The method as set forth in claim 3, wherein said predetermined number of decoded data bits is serially taken at a time from a bit sequence forming said decoding line;

said table is searched with both said decoded data bits and a position of the attentional bit in said decoded data bits, whereby the number of bits consecutively adjacent to the attentional bit having the same color as said attentional bit, is detected;

a pixel, adjacent to said attentional bit by a distance equal to the addition of 1 and the detected number of bits, is found as a color-changed pixel on said decoding line;

the found color-changed pixel on said decoding line is employed as a start color-changed pixel when decoding is performed according to the next code contained in said compressed data.

5. A unit for decompressing compressed data obtained by coding binary data, which comprises a plurality of data bit lines acquired from an image, for each data bit line, based on both a position of a color-changed pixel on said data bit line and a position of a color-changed pixel on a reference line adjacent to said data bit line, said unit comprising:

a table holding section for storing a table which lists a plurality of bit patterns represented by a predetermined number of reference data bits, and lists a consecutive number of bits adjacent to a predetermined data bit of the reference data bits, that have the same color as the predetermined data bit;

a reference line holding section for holding a reference bit sequence forming said reference line;

a compressed-data holding section for holding a data bit sequence forming said compressed data;

a decompressing section for serially taking said predetermined number of reference data bits at a time from said reference bit sequence, also taking said data bit sequence from said compressed-data holding section, and decoding said compressed data; and a decoding-line holding section for holing a decoding bit sequence which forms a decoding line obtained by decoding said compressed data with said decompressing section;

wherein said decompressing section searches said table with both said reference data bits and a position of the predetermined data bit in said reference data bits, and thereby detects the consecutive number of bits adjacent to the predetermined data bit, that have the same color as the predetermined data bit, finds a pixel, adjacent to the predetermined data bit by a distance equal to the addition of 1 and the detected number of bits, as a color-changed pixel on said reference line, and decodes said compressed data, based on a position of said found color-changed pixel on said reference line, and stores the decoded data in said decoding-line holding section.

6. The unit as set forth in claim 5, wherein said compressed data is data coded by modified-modified READ (MMR) coding; and said decompressing section serially takes said predetermined number of reference data bits at a time from said data bit sequence, searches said table with both said reference data bits and a position of the predetermined data bit, and thereby detects the number of 0s consecutively adjacent to the predetermined data bit, recognizes a coding mode according to a code that corresponds to the detected number of 0s, and decodes said compressed data according to the recognized coding mode.

7. The unit as set forth in claim 6, wherein said decompressing section employs a bit position in said reference data bits, which corresponds to a position of a start color-changed pixel present on said decoding line, as a position of an attentional bit.

8. The unit as set forth in claim 7, wherein said decompressing section serially takes said predetermined number of decoded data bits at a time from said decoding bit sequence, searches said table with both said decoded data bits and a position of the attentional bit in said decoded data bits, and thereby detects the number of bits consecutively adjacent to the attentional bit having the same color as said attentional bit, finds a pixel, adjacent to said attentional bit by a distance equal to the addition of 1 and the detected number of bits, as a color-changed pixel on said decoding line, and employs the found color-changed pixel on said decoding line as a start color-changed pixel when decoding is performed according to the next code contained in said compressed data.

9. A computer readable storage medium storing a data decompressing program which causes a computer to functions as a data decompressing unit for decompressing compressed data obtained by coding binary data, which comprises a plurality of data bit lines acquired from an image, for each data bit line, based on both a position of a color-changed pixel on said data bit line and a position of a color-changed pixel on a reference line adjacent to said data bit line, wherein said data decompressing program has a table holding section for storing a table which lists a plurality of bit patterns represented by a predetermined number of reference data bits, and lists a consecutive number of bits adjacent to a predetermined data bit of the reference data bits, that have the same color as the predetermined data bit;

also causes said computer to serially take said predetermined number of reference data bits at a time from a reference bit sequence forming said reference line, search said table with both said reference data bits and a position of the predetermined data bit in said reference data bits, and thereby detect the consecutive number of bits adjacent to the predetermined data bit, that have the same color as the predetermined data bit, find a pixel, adjacent to the predetermined data bit by a distance equal to the addition of 1 and the detected number of bits, as a color-changed pixel on said reference line, and decode said compressed data, based on a position of said found color-changed pixel on said reference line.

10. The computer readable storage medium as set forth in claim 9, wherein said compressed data is data coded by modified-modified READ (MMR) coding; and said data decompressing program causes said computer to serially take said predetermined number of reference data bits at a time from a data bit sequence forming said compressed data, search said table with both said reference data bits and a position of the predetermined data bit, and thereby detect the number of 0s consecutively adjacent to the predetermined data bit, recognize a coding mode according to a code that corresponds to the detected number of 0s, and decode said compressed data according to the recognized coding mode.

11. The computer readable storage medium as set forth in claim 10, wherein said data decompressing program employs a bit position in said reference data bits, which corresponds to a position of a start color-changed pixel present on a decoding line obtained by decoding said compressed data, as a position of an attentional bit.

12. The computer readable storage medium as set forth in claim 11, wherein said data decompressing program causes said computer to serially take said predetermined number of decoded data bits at a time from a decoding bit sequence forming said decoding line, search said table with both said decoded data bits and a position of the attentional bit in said decoded data bits, and thereby detect the number of bits consecutively adjacent to the attentional bit having the same color as said attentional bit, find a pixel, adjacent to said attentional bit by a distance equal to the addition of 1 and the detected number of bits, as a color-changed pixel on said decoding line, and employ the found color-changed pixel on said decoding line as a start color-changed pixel when decoding is performed according to the next code contained in said compressed data.

* * * * *